(12) United States Patent
Schmidt et al.

(10) Patent No.: US 11,792,383 B2
(45) Date of Patent: *Oct. 17, 2023

(54) METHOD AND SYSTEM FOR REDUCING RETURNS FROM RETRO-REFLECTIONS IN ACTIVE ILLUMINATION SYSTEM

(71) Applicant: nLIGHT, Inc., Camas, WA (US)

(72) Inventors: Bodo Schmidt, Carlsbad, CA (US); Steve Herman, Carlsbad, CA (US)

(73) Assignee: nLIGHT, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,870

(22) Filed: Mar. 7, 2022

(65) Prior Publication Data

US 2022/0303522 A1 Sep. 22, 2022

Related U.S. Application Data

(63) Continuation of application No. 16/242,939, filed on Jan. 8, 2019, now Pat. No. 11,272,162.

(60) Provisional application No. 62/614,982, filed on Jan. 8, 2018.

(51) Int. Cl.
*H04N 13/254* (2018.01)
*H04N 13/239* (2018.01)
*B60Q 1/04* (2006.01)

(52) U.S. Cl.
CPC ............. *H04N 13/254* (2018.05); *B60Q 1/04* (2013.01); *H04N 13/239* (2018.05)

(58) Field of Classification Search
CPC ....... H04N 13/254; H04N 13/239; B60Q 1/04
See application file for complete search history.

(56) References Cited

U.S. PATENT DOCUMENTS

| 10,641,897 | B1* | 5/2020 | Dussan ............... G01S 17/42 |
| 2010/0128109 | A1* | 5/2010 | Banks ............... G01S 17/894 348/46 |
| 2012/0274775 | A1* | 11/2012 | Reiffel ............... G06Q 30/08 348/158 |
| 2012/0299478 | A1* | 11/2012 | Park ............... B60Q 1/143 315/82 |
| 2014/0152989 | A1* | 6/2014 | Darrer ............... G01S 17/894 356/369 |
| 2017/0046845 | A1* | 2/2017 | Boyle ............... G06T 7/73 |

* cited by examiner

*Primary Examiner* — Girumsew Wendmagegn
(74) *Attorney, Agent, or Firm* — Stoel Rives LLP

(57) ABSTRACT

Systems and methods for reducing or eliminating undesired effects of retro-reflections in imaging are disclosed. A system for reducing the undesired effects of retro-reflections may include an illuminator and an optical receiver. The illuminator is configured to emit an illumination signal for illuminating a scene. The optical receiver is configured to receive returned portions of the illumination signal scattered or reflected from the scene. Return signals from retroreflectors present in the scene may oversaturate or otherwise negatively affect sensors in the optical receiver. To limit return signals from retroreflectors that may be present in the scene, the illuminator and optical receiver are physically separated from each other by an offset distance that limits or prevents retro-reflections from the retroreflectors from being received by the optical receiver.

17 Claims, 11 Drawing Sheets

METHOD AND SYSTEM FOR REDUCING RETURNS FROM RETRO-REFLECTIONS IN ACTIVE ILLUMINATION SYSTEM

CROSS REFERENCE TO RELATED APPLICATIONS

The Application is a continuation of U.S. patent application Ser. No. 16/242,939, filed on Jan. 8, 2019, now U.S. Pat. No. 11,272,162, which claims the benefit of U.S. Provisional Patent Application No. 62/614,982, filed on Jan. 8, 2018, both of which are incorporated by reference herein in their entireties.

TECHNICAL FIELD

This disclosure generally relates to imaging and, more particularly, to active illumination cameras and imaging systems, for example, those used in LIDAR or autonomous vehicles.

BACKGROUND

An active illumination system is a system in which an illuminator emits an electromagnetic signal that is reflected or otherwise returned from a scene of interest. The returned signal is sensed and processed by the system to determine useful information about the scene. In active illumination systems, glints, specular reflections or retro-reflections (such as license plates) often have a higher signal return, due to their directionality of the return, than other surfaces that scatter light (i.e. Lambertian scatters). This often poses a problem since the dynamic ranges of the imaging systems are not sufficient to cover both the bright specular reflections as well as the less bright scatter reflections. This may lead to either overexposure of the specular reflection and associated effects (such as blooming on CCD cameras, pixel saturation in a certain area) or underexposure of the scatter returns (and thus a lower signal-to-noise contrast in certain areas of the image).

Retroreflectors typically reflect light back directly at the illuminating light source within a narrow cone angle. For active illumination systems, the transmit or illumination component (Tx) of the systems are typically co-located with the receive components or lenses (Rx). This causes the light returned from retro-reflections to reflect mostly towards the Rx components of the systems. Since active illuminations systems are typically design for illuminating targets that are diffuse scatterers (e.g., Lambertian targets), retro-reflections from one or more retroreflectors in a scene of interest may overwhelm the Rx components of the active illumination systems.

SUMMARY

One or more systems and methods for reducing or eliminating undesired effects of retro-reflections in imaging are disclosed. A system for reducing the undesired effects of retro-reflections may include an illuminator and an optical receiver. The illuminator may be configured to emit an illumination signal for illuminating a scene. The optical receiver may be configured to receive returned portions of the illumination signal scattered or reflected from the scene. Return signals from retroreflectors present in the scene may oversaturate or otherwise negatively affect sensors in the optical receiver. To limit return signals from retroreflectors that may be present in the scene, the illuminator and optical receiver are physically separated from each other by an offset distance that limits or prevents retro-reflections from the retroreflectors from being received by the optical receiver.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components and diagrams in the figures are not necessarily to scale. In the figures, like reference numerals designate corresponding parts throughout the different views.

DETAILED DESCRIPTION

The following detailed description is offered not to limit but only to exemplify and teach embodiments of systems and methods for reducing the effects of retro-reflections in active illumination systems. These examples, offered not to limit but only to exemplify and teach embodiments of the invention(s), are shown and described in sufficient detail to enable those skilled in the art to practice what is claimed. Thus, where appropriate to avoid obscuring the invention(s), the description may omit certain information known to those of skill in the art. The disclosures herein are examples that should not be read to unduly limit the scope of any patent claims that may eventual be granted based on this application.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

Some specular reflections or reflections from retroreflectors made with microbeads or microspheres maintain the polarization state of the incoming light. This means that a crossed polarizer at the Rx subsystem of an active illumination system may suppress the predominantly polarized return light. Certain methods and systems for suppressing reflections from these types of objects are described in U.S. Provisional Patent Application 62/573,156, entitled "System and Method for Glint Reduction," filed Oct. 16, 2017, which is hereby incorporated by reference as though fully set forth herein in its entirety. However, another type of retroreflector that is becoming more prevalent uses microprisms. While the microprism-type of retroreflector maintains the polarization on a small or microscopic level, the integrated polarization across a large area is essentially depolarized. Thus, a different technique may be used to suppress retro-reflections from microprism-type retroreflectors.

Figure 1:
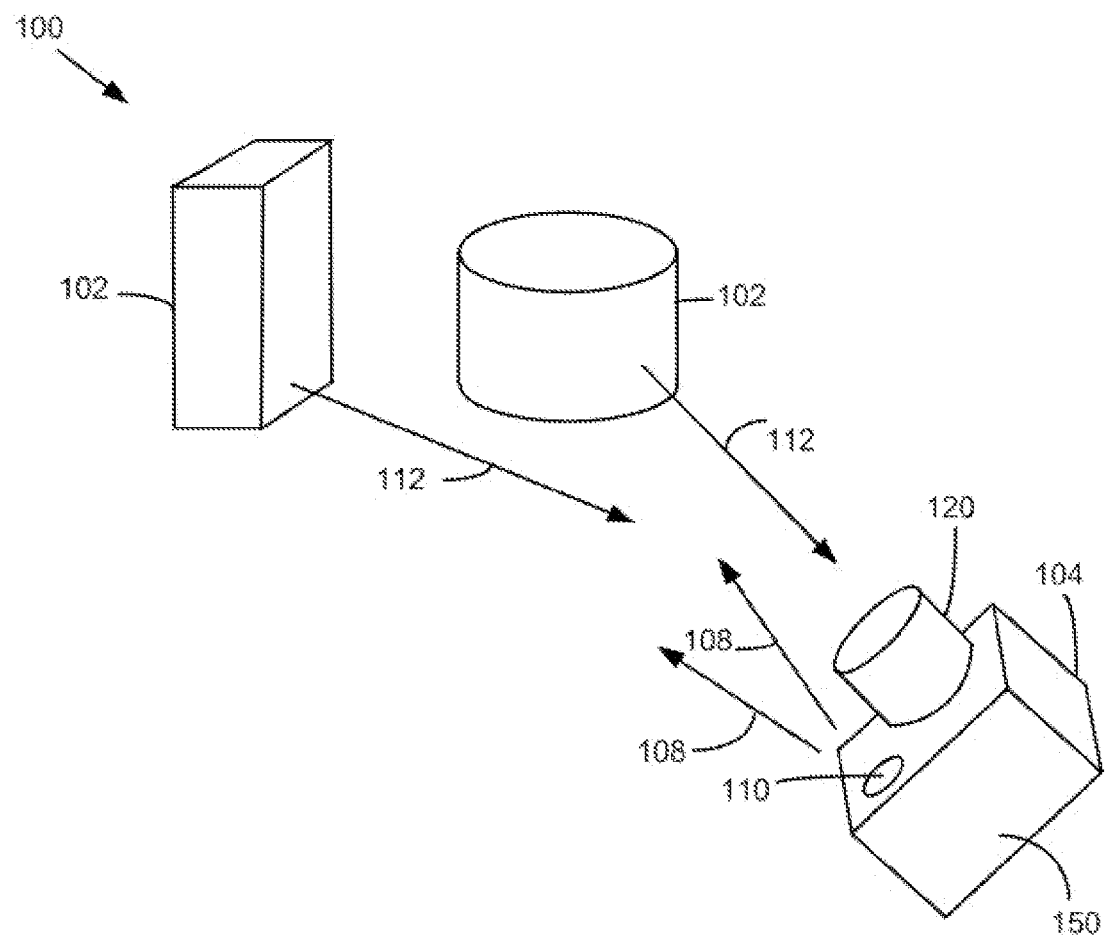
FIG. 1 illustrates a perspective view of an exemplary active illumination imaging system employing a configuration for reducing retro-reflections.

FIG. 1 illustrates a perspective view of an exemplary system 104 for processing one or more images using the offset illuminator/receiver techniques disclosed herein for reduces the ill-effects of retro-reflections. The images may be electronic representations of a scene of interest, which may or may not include visual information. For example, a captured image may include only range information without a human-viewable visual representation of a scene.

In some embodiments of the system 104, the light emitter 110 of the system 104 is physically separated from the light receiver of the system 104 by a sufficient distance so as to reduce the effect of retro-reflections from microprism-type retroreflectors present in a scene of interest.

The system 104 may be a camera or other imaging system used to capture an image of scene 100, which includes one or more objects 102. The scene 100 may be irradiated by illumination light 108 emitted from an illumination subsystem (illuminator) 110 included in the imaging system 104. Light, both ambient light and illumination light 108, is reflected or scattered from objects 102 in the scene, shown in FIG. 1. Some of the light from the objects 102 is received by the imaging system 104, shown as rays 112, and may be incident on a sensor subsystem 120 included in the imaging system 104.

The system 104 includes the illumination subsystem 110, the sensor subsystem 120, a processor subsystem 140 (shown in FIG. 2), and body 150 in which the various subsystems are mounted. The body 150 may further include a protective cover, not shown. The particular form of system 104 may vary depending on the desired performance parameters and intended application. For example, the system 104 may be sufficiently small and light as to be held by a single hand, similar to a camcorder, and may be configured to record relatively close scenes with acceptable resolution. Alternatively, the system 104 may be configured with a larger or smaller form factor.

Figure 4A:
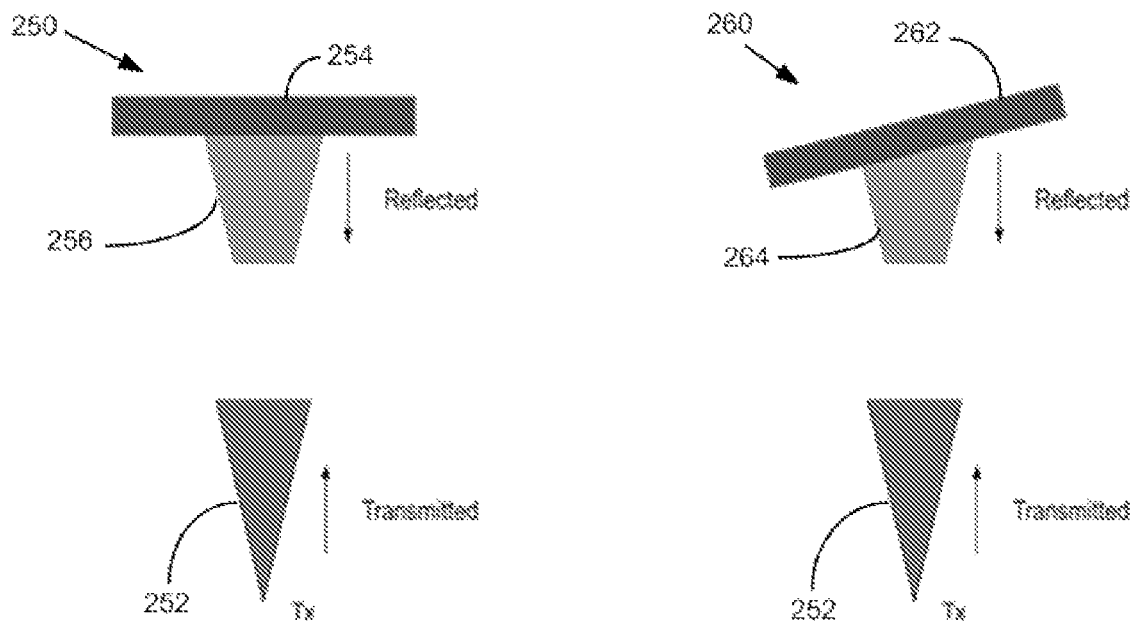
FIG. 4a is a graphical illustration of retro-reflection from a scene of interest back to an active illumination system.
Figure 4B:
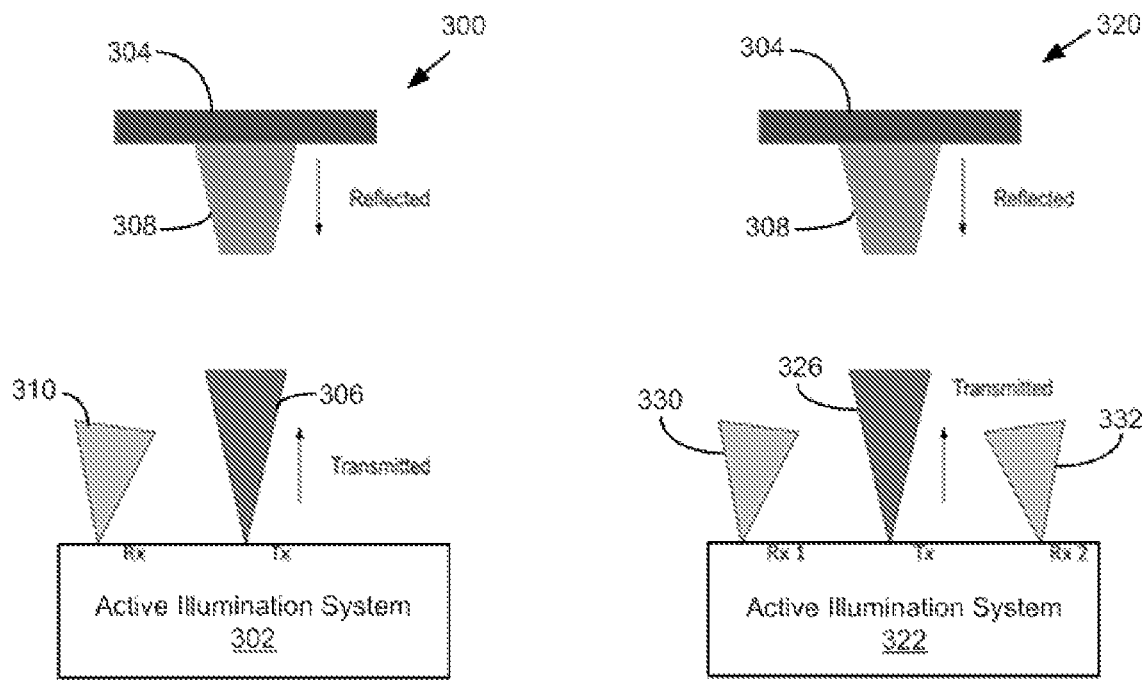
FIG. 4b schematically illustrates exemplary system configurations for reducing the effect of retro-reflections from a scene of interest.
Figure 4C:
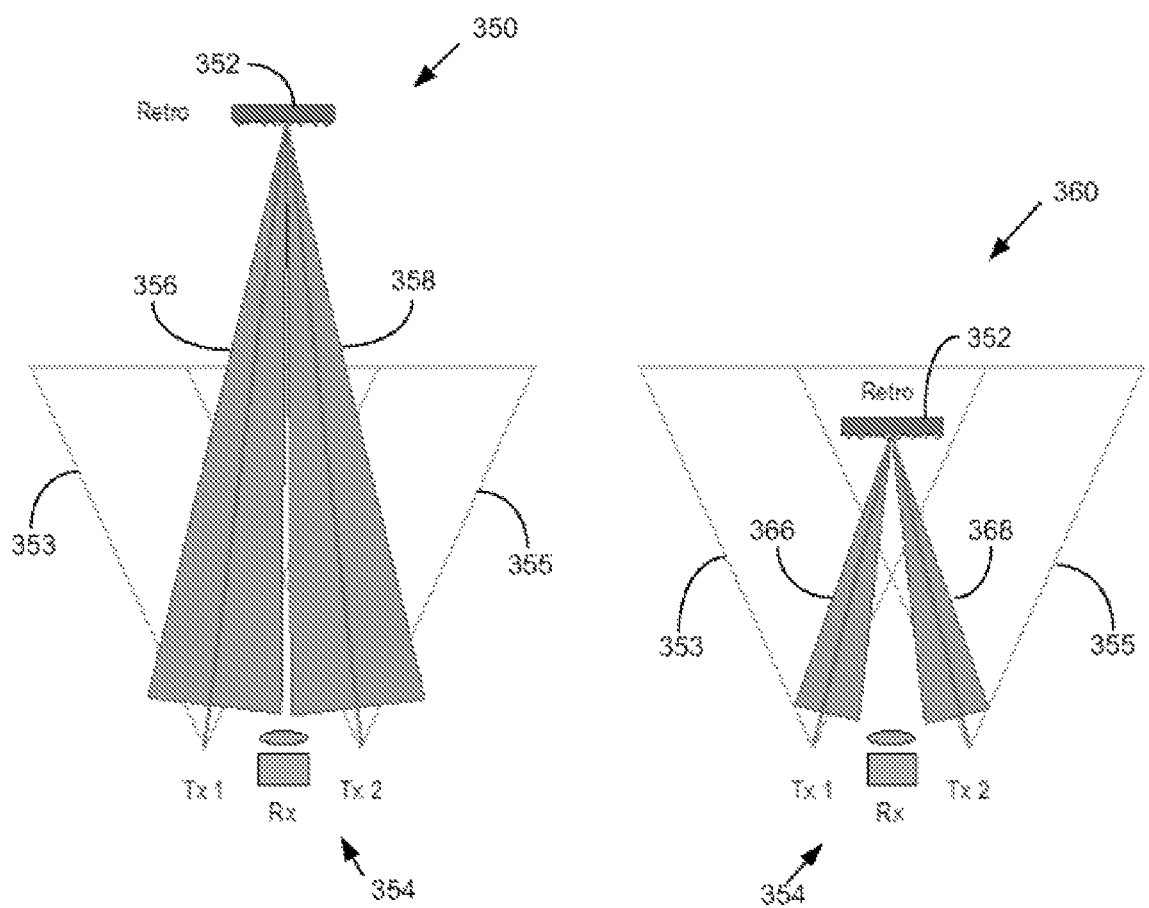
FIG. 4c schematically illustrates other exemplary system configurations for reducing the effect of retro-reflections from a scene of interest.

The imaging system 104 is configured so that the Rx receiver components are physically located away from the Tx illuminator components so that reflected light from bright reflectors such as microprism retroreflectors in the scene that is incident on the Rx subsystem is minimized or reduced. As shown in FIG. 1, the Tx illuminator 110 is located in the same body 150 as the Rx components, but are placed sufficiently away from the sensor 120 so that the unwanted effects of microprism retroreflectors in the scene 100 are reduced or eliminated. Other suitable offset configurations of the system 104 are illustrated in FIGS. 4a-c. The separation distance between the Rx and Tx components may be any suitable value, for example, it may be several centimeters in some configurations and in other configurations, the separation may be more than several centimeters, e.g., 5 cm or more, and in other configurations it may be on the order of meters, for example, between 5 cm and one meter, or one or more meters apart. Generally, the separation distance between the Rx and Tx components in the system 104 is selected so the Rx components are outside the reflection cone angle of the return light from the retro-reflections, such as those produced by microprism retroreflectors in a scene of interest. In this manner, the increased yet narrow signal returned from a retroreflector in a scene is not picked up by the Rx sensor and the undesired effects of retro-reflections may be avoided by the system 104.

The sensor may be single pixel sensor, such as a photo diode, or it may be an array of pixel sensors. The sensor may be selected to be responsive to any suitable frequency band of electromagnetic radiation. The emitted light 108 may be a pulse of light or any other suitable electromagnetic radiation emission that is detectable by the sensor, including but not limited to the light pulses described herein with regard to the other figures.

In some instances, the ambient or background light impinging on the imaging system 104 can affect the system 104 such that the operational performance of the imaging system 104 may be degraded. For example, with active illumination systems, if the ambient source is very bright, it may reduce dynamic range or saturate the system camera sensor and make it unable to detect the active illumination. Ambient light may also increase errors for each pixel measurement due to systematic offsets (e.g., reflections from the ambient light that are not the same as ambient) and additional noise terms (e.g., if there is a large ambient level and a relatively small active illumination signal, the ambient light contributes a larger pixel noise that remains even after subtracting the ambient from the actively illuminated image).

Thus, the imaging system 104 may also be configured to reduce or eliminate the ambient light component of a captured image by capturing an ambient image of the scene 100, i.e., an image where the scene 100 is illuminated by ambient light only, and then subtracting the ambient component from an actively illuminated image created by illuminating the same scene with predefined light. To accomplish ambient light reduce/elimination, some versions of the system 104 may be additionally configured to include one or more of the techniques and methods of ambient light reduction described in co-pending U.S. patent application Ser. No. 15/823,482, entitled "System and Method of Reducing Ambient Background Light in a Pulse-Illuminated Image," filed Nov. 27, 2017 ("'482 application") which is hereby incorporated by reference as though fully set forth herein in its entirety, in combination with retro-reflection reduction/elimination techniques disclosed herein.

Both 2D and 3D imaging systems using the disclosed methods and systems are described herein. In addition, the systems and methods disclosed herein can also be applied to 1D imaging systems (e.g., line imagers such as barcode scanners).

Figure 2:
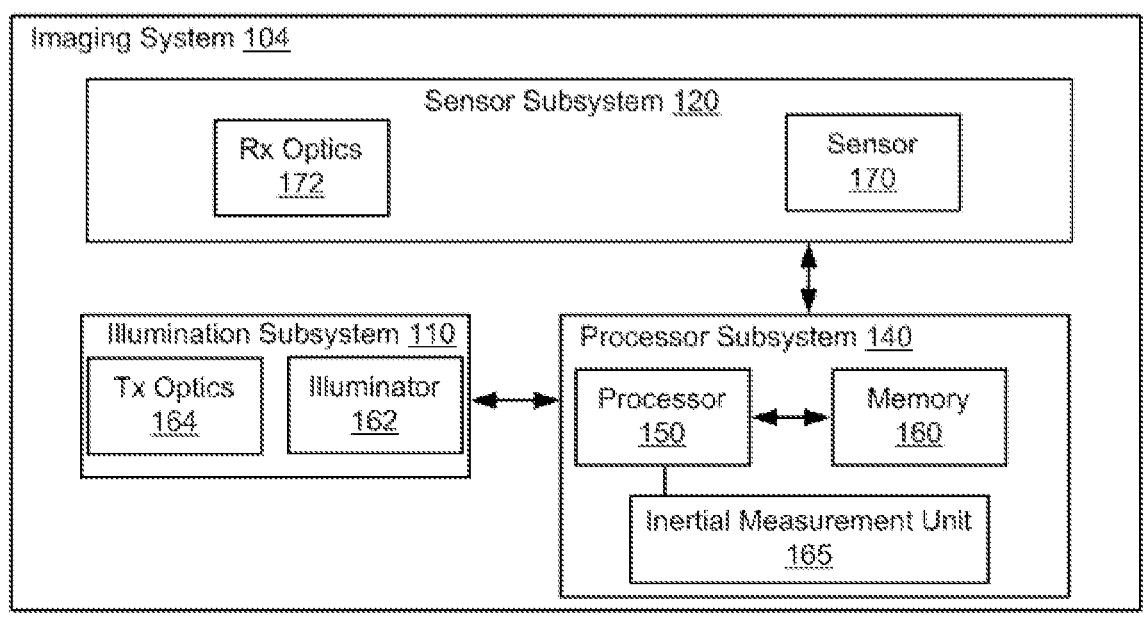
FIG. 2 is a schematic block diagram illustrating certain components of the active illumination imaging system shown in FIG. 1.

Referring now to FIG. 2, this drawing is a schematic block diagram illustrating certain components of the imaging system 104 shown in FIG. 1. The system 104 may be configured to capture 1D, 2D or 3D images. Specific examples of certain 3D imaging systems are described herein in greater detail below with reference to other figures. The system 104 includes the sensor subsystem 120, the illumination subsystem 110, and a processor subsystem 140.

The illumination subsystem 110 includes an illuminator 162 that is configured to illuminate the scene 100 with a predefined electromagnetic signal, for example, one or more light pulses. The sensor subsystem 120 includes a sensor 170 that is configured to output one or more electronic signals representing images in response to received light. The processor subsystem 140 includes a processor 150 that is configured to process image signals from the sensor 170 to produce a captured image. The processor 150 may do this by causing the illumination subsystem 110 to emit a light pulse from the illuminator 162. The processor then causes the sensor subsystem 120 (and the sensor 170 therein) to capture an actively illuminated image of the scene 100, where the actively illuminated image results, at least in part, from portions of the light pulses reflected or scattered from the scene 100.

As shown in FIG. 2, the illumination subsystem 110 includes a light source such as the illuminator 162, and transmission (Tx) optics 164, which may include a transmission lens (not shown) such as a single lens, a compound lens, or a combination of lenses. The illumination subsystem 110 may also include other optical elements such as diffusers, beamshapers, and/or the like that affect characteristics of light emitted by the subsystem 110.

The illuminator 162 may be any suitable light source, such as one or more lasers, light emitting diodes (LEDs), vertical cavity surface emitting laser (VCSELs), strobe lights, or the like, but not limited thereto. For example, the illuminator 162 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

The illuminator 162 may be configured to generate one or more light pulses (e.g., laser pulses). Any suitable light pulse can be used that has a duration smaller than or matching the exposure time of the sensor 170 in the system 104. For example, for some 3D imaging applications the emitted light pulses may each be less than 1 µs in duration, such as a duration of about 100 ns. In other applications, each pulse width may be about 10 ns. For example, using a q-switched laser as a light source, pulse widths of less than 10 ns and laser recovery times of about 1 µs of more may be achieved for a high repetition rate (about 1 MHz). In system configurations using directly driven laser diodes, LEDs, and/or VCSELS, pulse widths of 10 ns or greater may be achieved. These systems may have repetition rates of about 100 MHz. Other pulse widths may be employed, for example, each light pulse may have a relatively short duration such as a duration of 2 nanoseconds or less, for example, between 1 nanosecond and 50 picoseconds.

Depending on the application, longer pulses in the microsecond range may be used. For some imaging applications, a pulse width of 10 s of microseconds may be used. For example, pulse widths may have a duration in the range of 1 µs to 1 ms. For such pulse widths the repetition rate can be about 100 kHz or less.

Any suitable portion of the electromagnetic spectrum can be used for the light pulses, for example, a light pulse may be visible light, infrared, ultraviolet radiation, any overlap of these spectrums, or the like. Also, the spectral bandwidth of the light used for the pulses can be any suitable value, depending on the application. For some imaging applications, the spectral bandwidth may be a few nanometers to allow for a spectral filter to be used in the sensor subsystem 120. For example, the light pulse bandwidth may be about 5 nm, center at a wavelength of about 808 nm. In some applications, e.g., indoor usage of the system 104, the spectral bandwidth of the illuminator 162 may be configured so that it does not coincide or has less overlap with some of the typical output spectrums of artificial light sources such as fluorescent lights and LED lighting.

The transmission optics 164 may include a Tx lens and/or other optical elements that are configured to match the divergence of a light pulse emitted from the illumination subsystem 110 to the field of view (FOV) of the sensor subsystem 120. The divergence of a light pulse may be any suitable value, for example, any angle of 1 degree or greater, for example, between 1 and 180 degrees, or between 1 and 120 degrees, or between 2 and 90 degrees, or between 2 and 40 degrees, or between 5 and 40 degrees.

In some configurations of the imaging system 104, the illumination subsystem 110 may be a separate device from the imaging system 104. As described herein, at least the receive optics of the sensor subsystem 120 and the transmit optics of the illumination subsystem 110 are physically offset from each other so that the receive optics are outside the cone of returned light from retroreflectors in the scene of interest. By physically separating the Rx and Tx components of the system 104, the adverse effects of retro-reflections, particularly those reflections from microprism type retroreflectors, may be reduced. In some configurations, the angle between the Rx lens optical axis and the illumination subsystem 110 optical axis may be set to be an angle other than 0. For example, the angle between the optical axes may be between 0 and 0.5°, between 0.5° and 2°, and in some configurations greater than 2°.

The sensor subsystem 120 includes receiving (Rx) optics 172 and image sensor 170. The sensor subsystem 120 may also optionally include a modulator (not shown) for modulating received light in order to determine a time-of-flight (TOF) or range information related to an image, as discussed herein in connection with other figures.

The Rx optics 172 may include a receiving lens (not shown) that collects reflected pulse portions from the scene 100. The receiving lens may be a non-collimating lens that focuses the incoming light into an image. The appropriate aperture size of the lens may depend on the particular application, and may be between, for example, 1 cm and 2.5 cm. Other portions of the reflected or scattered light pulse, e.g., those portions that are reflected in directions other than back toward system 104, may not be captured by receiving optics 172. Like the transmission lens, the receiving lens may include a single lens, a compound lens, or a combination of lenses or other reflective or refractive elements.

Figure 6:
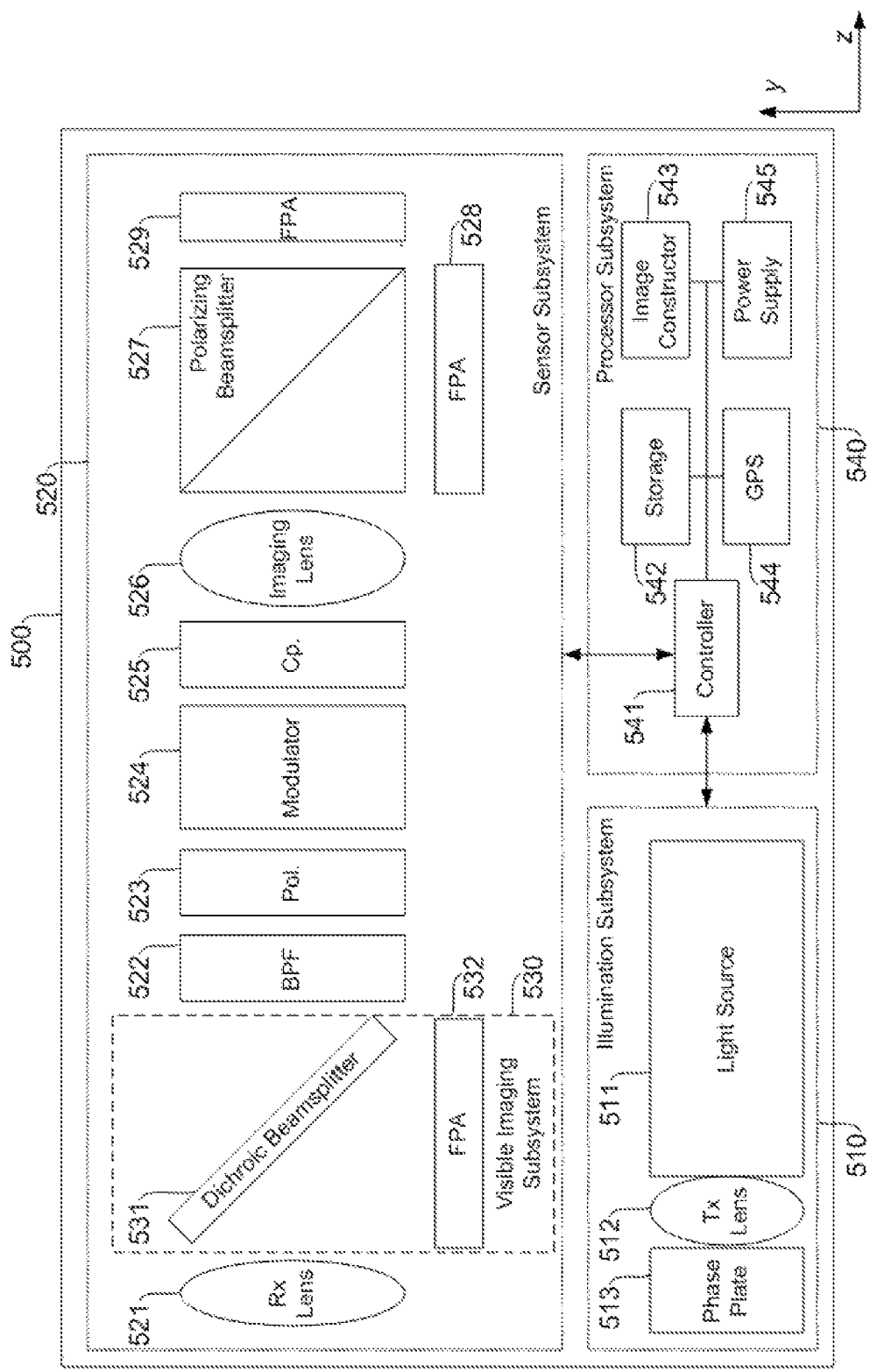
FIG. 6 schematically illustrates a second exemplary 3D imaging system employing at least one of the disclosed configurations for reducing retro-reflections.

The Rx optics 172 may also include other optical elements such as one or more spectral or band pass filters (BPFs), polarizers, or the like that affect characteristics of incoming light received by the sensor subsystem 120. In some cases, the spectral filter(s) may be matched to the bandwidth of the pulses emitted from the illumination subsystem 110 such that filter passes light in the pulse bandwidth while blocking light outside the pulse bandwidth. FIG. 6 discloses an example of BPF 522 that may be included in the Rx optics 172.

In other cases, Rx optics 172 may also collect broadband or multiband (e.g., visible) information about scene 100, e.g., unfiltered ambient light that scene 100 scatters or reflects towards receiving optics 172. As such, the receiving lens may be configured to reduce or eliminate possible aberrations known in the art of optical system design that may degrade image quality for one or more of the bands received.

In some configurations of the imaging system 104, the Rx optics 172 or sensor subsystem may be a separate device from the imaging system 104.

The image sensor 170 creates one or more digital images based on light 112 it receives from the scene 100. It does this by converting incoming photons into electronic signals representing the image. The light 112 may include ambient light and returned light pulse portions that that receiving optics 172 collect. These images contain positional information about objects 102 in scene 100.

The image sensor 170 may utilize a single photosensitive element, such as a photodiode. Alternatively, the image sensor may utilize a focal plane array (FPA) to obtain an image which provides a signal in response to light illumination that is then digitized. The FPA includes an array of light-detecting elements (e.g., photodiodes as pixels, positioned at a focal plane of the Rx optics that image a scene. Each pixel of the sensor 170 determines an illumination intensity signal that indicates the intensity of light received by the pixel.

The image sensor 170 may be an off-the-shelf CCD or CMOS imaging sensor. In particular, such sensors may be readily commercially available for visible-wavelength applications, and require no significant modification for use in system 104. In one example, image sensor 170 is a commercially purchased CMOS sensor from Sony Corporation having megapixel resolution. Some sensors for use in near-infrared applications are commercially available, albeit at substantially greater cost than the ubiquitous visible-wavelength sensors, and others are currently being developed. It is anticipated that any of a type of optical sensor, including those yet to be invented, may be used successfully with the systems disclosed herein. Generally, the image sensor 170 may include an array of pixels, where each pixel can determine the intensity of received light thereon. An image sensor array may include any suitable number of pixels, and contemporary sensors often include millions of pixels. The performance of the image sensor 170 may be characterized by a frame rate, which is how many times the pixel array of the sensor 170 may be read per second; and also characterized by a frame time, which is the amount of time it takes to read the pixel array.

In some cases, the image sensor 170 does not include internal storage and the image data from the pixel array must be read out and processed by the processor 150. In other cases, the image sensor 170 includes on-board memory for storing one or more images captured by the pixel array so that a prior image does not have to be read-out from the sensor 170 before a second image is captured. In another configuration, the image sensor 170 may include the on-board memory for storing one or more images captured by the pixel array and a processor for performing image processing functions typically performed by the processor subsystem 140, such as the methods disclosed herein.

The frame time of the sensor 170 may be a frame time in the range between 5 ms and 500 ms and may be about 33 ms, representing a sensor frame rate of 30 frames per second.

The processor subsystem 140 includes processor 150 coupled to a memory 160 and also operably coupled to an inertial measurement unit 165. The functionalities of such components may alternatively be distributed among other components of system 104, including but not limited to on-board processors on the sensor 170.

The processor 150 receives digital image data from the sensor subsystem 120, and may store the image data in the memory 160 and perform further processing on the image data, for example, to remove ambient light and enhance the image of the scene 100. For example, processor subsystem 140 may normalize stored images to compensate for variations in reflectance or scattering between objects 102. Normalization may be particularly useful where variations in reflectance or scattering from objects 102 are due to active illumination versus ambient illumination. The processor subsystem 140 may also calculate image parameters based on the normalized images. For example, the processor 150 may be configured to perform digital filtering on image data.

Further, the processor subsystem 140 may process image data that includes grayscale or color information about the scene 100. The processor subsystem 140 may further control and coordinate the operation of illumination subsystem 110 and sensor subsystem 120, as described herein. For example, it may control and coordinate the timing of the emitted illumination pulses, adjust the polarization of an adjustable input polarizer (discussed below), and/or adjust the illumination pulse intensity.

The functions of the processor subsystem 140 may be implemented in hardware, software, firmware, or any suitable combination thereof. If implemented in software, the functions may be stored as one or more instructions or code on a computer-readable medium (e.g., memory 160) and executed by a hardware-based processing unit (e.g., processor 150). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media (e.g., memory 160) can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The processor 150 may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The memory 160 and processor 150 may be combined as a single chip. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits, including logic circuits and/or logic elements.

The inertial measurement unit 165 includes components for measuring parameters associated with the movement and position of the system 104. For example, the unit 165 may include one or more compasses, GPS units, accelerometers, any combination of the foregoing, or the like. These components may be commercially available electronic chip components embedded in the subsystem 140. The processor 150 can execute software stored in the memory 160 for controlling the operation of these components and extracting data therefrom regarding movement and/or location of the system 104. The processor 150 can also be configured to associate these data with captured image data and store them in the memory 160, with or without the corresponding image data.

Figure 3A:
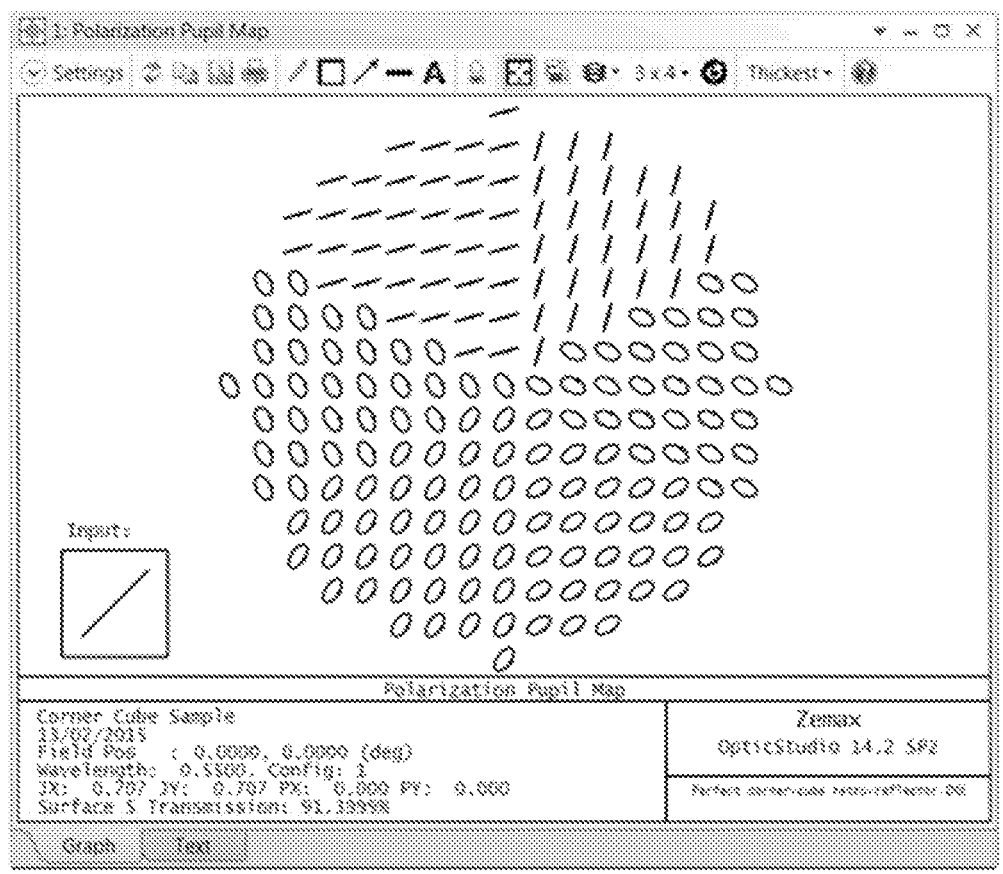
FIG. 3a is a graphical illustration of exemplary retro-reflection polarizations from a microprism retroreflector.

FIG. 3a is a computer screenshot showing a graphical illustration of example retro-reflection polarizations from a microprism retroreflector. The graph of FIG. 3a shows polarizations from a microprism corner-cube retroreflector that generates six distinct return polarizations from a single polarized input. A corner cube retroreflector, also known as a CCR or trihedral prism, is an optical structure that consists of three adjacent, mutually-orthogonal plane-reflecting surfaces which form the corner of a cube. The corner cube reflects an incident ray at a specific angle, independent of the prism and beam orientations. Typical corner cube designs reflect the incident light at 180 degrees.

Figure 3B:
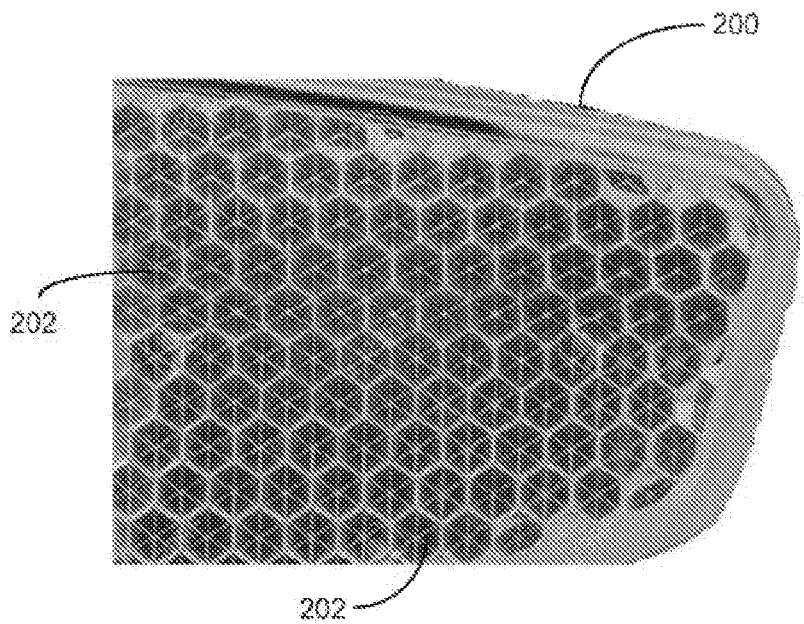
FIG. 3b shows an example microprism retroreflector.

FIG. 3b shows an example microprism retroreflector 200. The retroreflector 200 has microprisms 202 that are typically on the order of a millimeter is size. So if the retroreflector 200 has a relatively large area, the polarizations of reflected light from each microprism 202 are essentially scrambled and cannot be resolved by optical imaging system receiving the light reflected from the retroreflector 200, particularly with the retroreflector 200 located at long distances from the Rx components of the imaging system. Nevertheless, the light return of these retroreflectors is typically confined to a narrow cone angle relative to the input direction and thus always reflects the light back towards the Tx subsystem of the imaging system.

FIG. 4a is a graphical illustration of example retro-reflections from two different scenes of interest 250, 260 back to an active illumination system (not shown). The active illumination system emits illumination light (Tx light 252) that illuminates a retroreflector 254 or 262 in the scenes. In the first scene 250 (left-hand side of FIG. 4a), the retroreflector 254 is generally normal to the incident light 252 from the illumination system. In the second scene 260 (right-hand side of FIG. 4a), the retroreflector 262 is at an angle to the incident light 252 from the illumination system. In either scene 250, 260, light is reflected 256, 264 directly back at the illumination system. Generally, the angle of the retroreflectors 252, 262 relative to the illumination system does not cause the reflected light to take a path other than that back to the illumination source, as shown in the figure.

FIG. 4b schematically illustrates exemplary configurations for reducing the effect of retro-reflections from a scene of interest. The left-hand side of the FIG. 4b shows a first operation scenario 300 involving a first configuration where an active illumination system 302 includes a receiver (Rx) offset in location from a transmitter (Tx) of the active illumination system 302. The first system 302 includes Tx components that emit illumination signal 306, which is reflected back by retroreflector 304 as return light 308. The first system 302 also includes Rx components for receiving light 310, where the Rx components are located away from the Tx component so as not to receive returned light 308 from the retroreflector 304.

The right-hand side of the FIG. 4b shows a second operational scenario 320 involving a second configuration with an active illumination system 322 with two receiver subsystems (Rx1 and Rx2) physically offset from the Tx subsystem. The second system 322 includes Tx components that emit illumination signal 326, which is reflected back by retroreflector 304 as return light 308. The second system 322 also includes two sets of Rx components for receiving light 330 and 332, respectively, where the Rx components are located away from the Tx component so as not to receive returned light 308 from the retroreflector 304.

Any of the active illumination systems disclosed herein can be configured in either of these manners 302, 322 shown in FIG. 4b.

If the Rx and the Tx components of the active illumination systems 302, 322 are spatially separated from each other, the return light 308 from the retroreflector 304 may miss the Rx components for ranges that are below the return cone angle of reflected light 308 of the retroreflector 304. This reduces the adverse effects of the retro-flections on the imaging systems 302, 322. Two options 302, 322 are illustrated in FIG. 4b—the left-hand side shows a system 302 where the single Rx and Tx are displaced from each other. The right-hand side of the FIG. 4b shows an optional configuration 322 that has two Rx components offset and oriented symmetrically about the Tx subsystem. The advantage of two Rx components is that the active collection area may be doubled and the imaging system 322 can utilize other modalities for ranging (e.g., stereoscopic vision system). Alternatively, the Rx components may be asymmetrically offset in some configurations of the system 322. More than two Rx components may be used in some configurations.

FIG. 4c schematically illustrates another exemplary configuration of an active illumination system 354 for reducing the effect of retro-reflections from a scene of interest. In this configuration, the active illumination system 354 include two or more Tx components are incorporated in the active illumination system 354 with one Rx component. As shown in the example operational scenarios 350, 360 of FIG. 4c, the Rx component may be located in the middle between the two Tx components of the system 354. The Rx component is physically located so that it is away from the Tx components, outside or largely outside the return light cones 356, 358, 366, 368 from the retroreflector 352. The advantage of having two Tx subsystems or components is an increase in illumination and less shadow effects that occur when the Tx and Rx are not co-located.

The left-hand side of FIG. 4c shows a first operational scenario 350, and the right-hand side of FIG. 4c shows a second operational scenario 360. These two operational scenarios illustrate the range effect. For both operational scenarios 350, 360, the Tx components of the system 354 emit illumination signals 353, 355, respectively, which illuminate the retroreflector 352. In both scenarios 350, 360, the retroreflector returns light cones 256, 358, 366, 368 with an angle spread towards the respective sources (the Tx components). As shown on the left-hand side of FIG. 4c (first scenario 350), when the retroreflector 352 is located at a greater distance from the system 354, the return light cone overlaps with the Rx component and is detected by the Rx subsystem. As shown by the right-hand side of FIG. 4c (second scenario 360), the retroreflector 352 is closer to the active illumination system 354, and due to the larger angle between the Tx light cones 353, 355 and the normal of the retroreflector 352 surface, the Rx component or subsystem of the active illumination system does not receive direct light reflected (returned light cones 366, 368) from the retroreflector 352.

Any of the active illumination systems disclosed herein can be configured in the manner of system 354 shown in FIG. 4c.

Any of the active illumination systems disclosed herein may be built into automobiles. The active illumination system configuration that includes two or more Tx components (subsystems) is attractive for automotive applications, where the Tx subsystems can be built into and co-located with the headlights, and the Rx component may located centrally behind the windshield.

The reflected light from the retroreflector in the off-axis condition may maintain a residual effective polarization state, and thus, the crossed polarization methods disclosed in U.S. Provisional Application 62/573,156, entitled "System and Method for Glint Reduction," filed Oct. 16, 2017, which is hereby incorporated by reference in its entirety, may be used in combination with the physically offset Rx and Tx components to further reduce the undesired effects of retro-reflections in the active illumination systems disclosed herein.

Figure 4D:
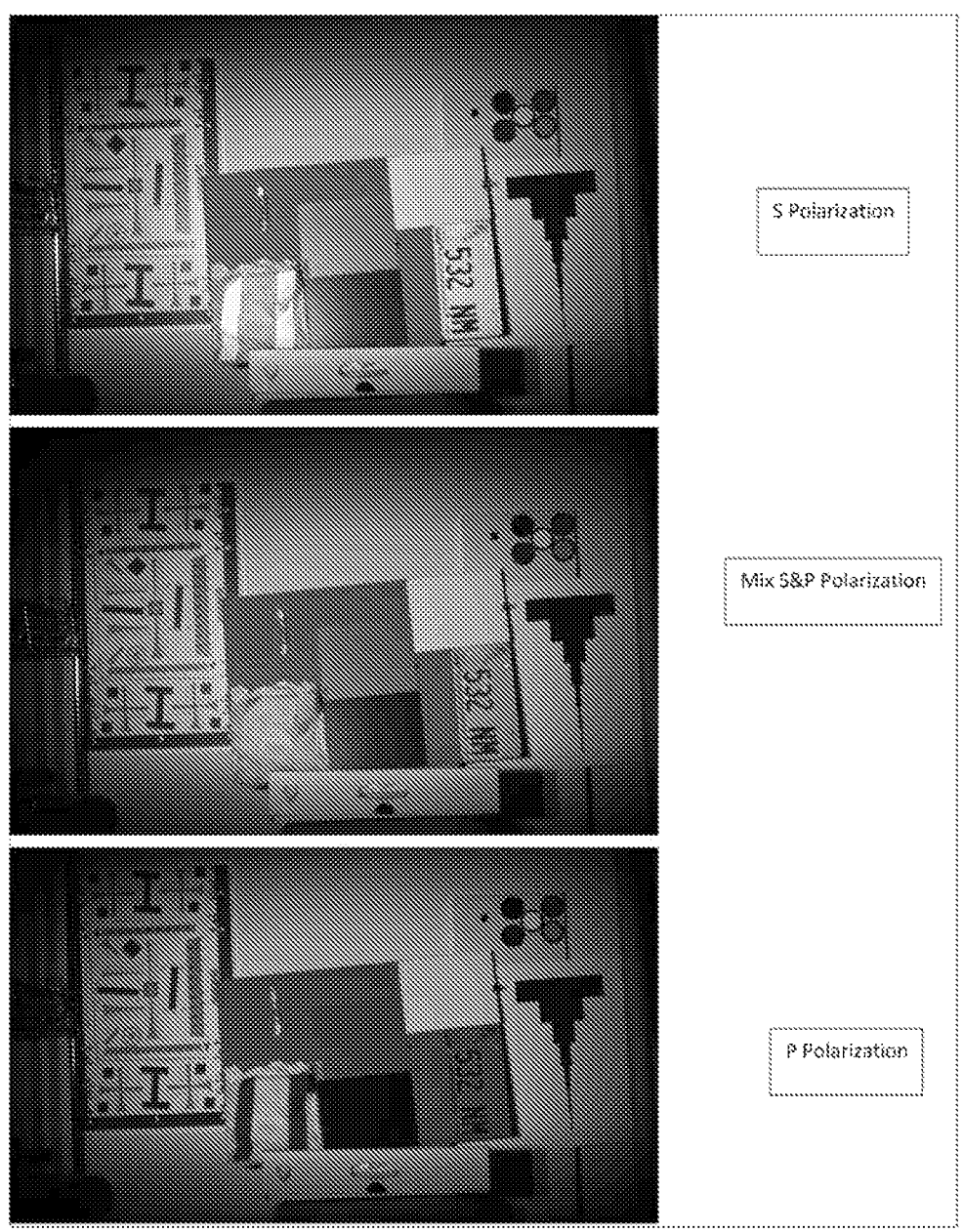
FIG. 4d shows photos of experimental lab results of a system configured with offset Rx and Tx components used to image a scene that includes retroreflectors.

FIG. 4d shows photos of experimental lab results of an active illumination system configured with offset Rx and Tx components used to image a scene with retroreflectors. The photos show the results of using an adjustable Rx polarizer that is included in the active illumination system. An adjustable input polarizer included in the Rx subsystem (e.g., an adjustable polarizer may be substituted for polarizer 1272) may be used to selectively attenuate or brighten retroreflectors targets relative to Lambertian targets. This can be used as a way to increase the dynamic range of the active illumination system. The adjustable input polarizer may be controlled by the processor subsystem or other controller of the active illumination system. The adjustable polarizer may be a commercially-available adjustable polarizer configured to change its polarization state in response to electronic control signals, such as those controlled and/or produced by a processor, such as a microprocessor.

The photos of FIG. 4d show a scene that includes an object having two retroreflector stripes at the left hand side. The top photo shows the image captured by the system when the adjustable input polarizer passes an S polarization state of returned light. The middle photo shows the image captured by the system when the adjustable input polarizer passes a mixed S and P polarization states of returned light. The bottom photo shows the image captured by the system when the adjustable input polarizer passes a P polarization state of returned light. The photos show how the brightness of the retroreflectors varies with the different adjustments of the inputs polarizer.

Retroreflectors are inherently brighter than most other objects in a scene and may be used to increase the measurement range of the systems (e.g., spotting traffic lights at long distances). However, simultaneous measurement of retroreflectors and Lambertian targets may be difficult due to the large dynamic range. This can be addressed with HDR sensors or selective attenuation techniques, but it may be desirable to reduce the reflections from retroreflectors down to a similar level as Lambertian targets. The relative brightness ratio of light returned by the retroreflectors and Lambertian targets may be adjusted by using the adjustable Rx input polarizer.

Another option for an adjustable input polarizer is to use a switchable polarization element (such as an LCD screen) as a substitute for the Rx polarizer 1272. This would provide a method to vary the retroreflector return signal from one frame to the next or even on a pixel-by-pixel basis. The LCD screen may be controller by the processor subsystem or controller included in the active illumination system.

In some scenes, there is a return angle for which retro-reflections are dominating over Lambertian targets. This generally occurs for targets that are at longer ranges from the active illumination system. The longer distances result in smaller return angles. Beyond a certain distance, the retro-reflections are returning more light than Lambertian targets at the same distance; however, all returns still fall off with $1/r^2$. The system could be tuned, using for example the adjustable input polarizer, so that there is a simultaneous acquisition of Lambertian targets at short range and retroreflectors at long ranges, with both of them still in dynamic range of the image sensor of the active illumination system.

FIGS. 5-10 illustrate exemplary 3D imaging systems that may each include physically separated Rx components and Tx components, as well as adjustable input polarizers. By physically separating the Rx and Tx components of these systems, the adverse effects of retro-reflections, particularly those reflections from microprism-type retroreflectors, may be reduced.

Figure 5:
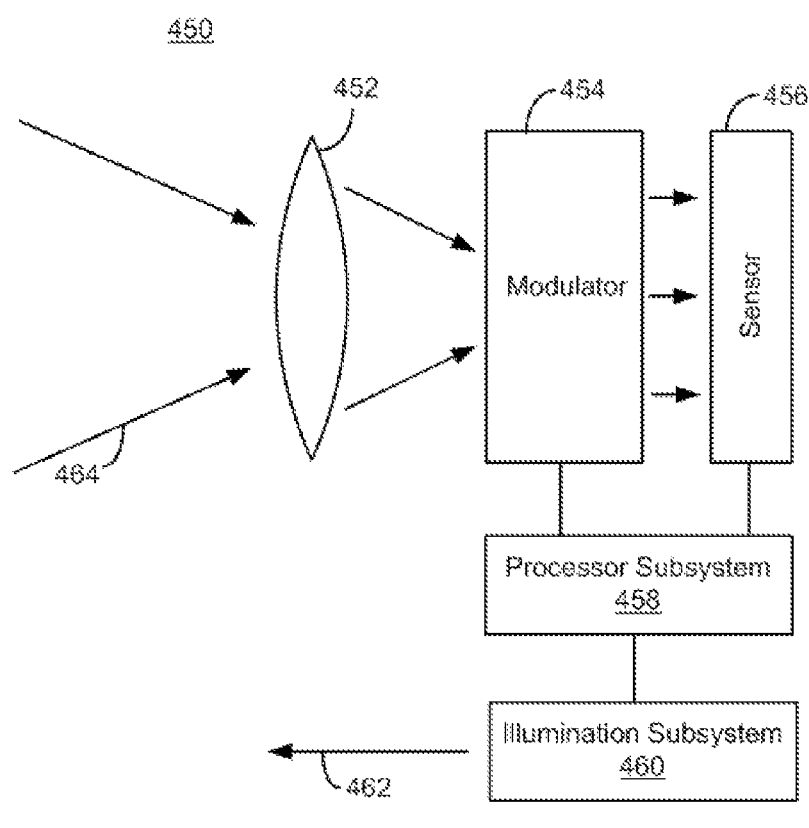
FIG. 5 schematically illustrates a first exemplary 3D imaging system employing at least one of the disclosed configurations for reducing retro-reflections.

FIG. 5 schematically illustrates a first exemplary 3D imaging system 450 employing one or more of the disclosed techniques for reducing undesirable effects of retro-reflections. The system 450 include receiving (Rx) optics 452, a modulator 454, at least one sensor 456, a processor subsystem 458, and optionally, an illumination subsystem 460. The illumination subsystem 460 may be separate from the system 450 in some configurations. The positions of Rx optics 452 and the modulator 454 may alternatively be reversed, with the Rx optics 452 following behind the modulator 454. The modulator 454 may also be integrated within the sensor 456. The Rx components of the system 450 may be physically located away from the Tx components of the illumination subsystem 460, as disclosed herein, so as to reduce or eliminate the undesirable effects of retroreflections in a scene of interest.

Capturing the 3D position of surfaces and objects in a scene is becoming more and more commonplace for imaging applications. The system 450 can be used in applications such as robotic vision, autonomous vehicles, surveying, video game controls, visual effects, augmented-, mixed-, virtual-reality or similar, mapping, and other applications where it is useful to know coordinate or location information about areas of the real-world. The system 450 is able to capture the 3D information along with images or video in high resolution in the same way two dimensional (2D) video cameras and cell phone cameras function today. Size, weight, and power requirements for the system 450 are relevant considerations, and may depend on the application in which the system 450 is used. For example, the system 450 or any of the other systems disclosed herein may be included in a handheld device, such as a still or video camera, smartphone, or the like.

How the system 450 captures range or 3D information is generally described as follows. The illumination subsystem 460 emits an illumination pulse 462 under the control of the processor subsystem 458 for irradiating a scene. Portions of the illumination pulse 462 are returned from the scene to the system 450 where they are collected by the Rx optics 452, which passes the received light through the modulator 454. After passing through the modulator 454, the received light is the detected by the sensor 456 and then electronic pixel image data from the sensor 456 is processed by the processor 458 to extract information about the scene. Referring back to FIG. 1, objects 102 in the scene 100 are each at different positions in the scene and also have different shapes. As such, if the 3D system 450 is used to image the scene 100, for example, different portions of the illumination pulse will travel different distances from the illumination subsystem 460 to irradiate the objects 102, as well as to irradiate different features or areas of each object individually, before the objects 102 scatter and/or reflect the pulse portions back toward system 450. As such, each of the pulse portions may have a different time-of-flight (TOF). Additionally, the reflected or scattered pulse portions have different intensities, depending on the reflectivity of the irradiated feature of each object 102, and the angle of that feature relative to system 450. The modulator 454 and sensor 456, under the control of the processor subsystem 458 are configured to determine the TOF for the received pulse portions, and thus, the range information corresponding to objects 102 in the scene 100. Specific examples of how this may be done are described in further detail herein in connection with FIGS. 6-10

The illumination pulse 462 may be any suitable electromagnetic signal having an appropriate spectral distribution and duration for the application at hand. For example, the pulse 462 may have the characteristics described for the light pulses disclosed elsewhere herein, e.g., those described in connection with FIGS. 1-4 and 6. The illumination subsystem 460 may include the functionality and components described for the other illumination subsystems 110, 510 disclosed herein in connection with FIGS. 2 and 6, respectively. The subsystem 460 may be controlled by the processor subsystem 458 in the manners as described herein in connection with those same figures.

The system 450 receives light 464, including returned portions of the light pulse 462 via the Rx optics 452. The Rx optics 452 may include the functionality and components included in the Rx optics 172 described in connection with FIG. 2.

The modulator 454 may include an electro-optic modulator, located along an optical axis of the system 450, configured to modulate as a function of time a characteristic of the received portion of the light pulse from the scene to form a modulated light pulse portion. The modulated characteristic may include the intensity of the light, its polarization state, its refraction passing through the modulator 454, any combination or the foregoing, or the like. The modulator 454 may be located at the focal plane (image plane) of the Rx optic 452. However, in other configurations of the system 450, the modulator 454 is not located at the image plane of the Rx optics 452. The modulator 454 may include a polarization modulator, compensator(s) and/or polarizer(s), for example, as described for the systems illustrated in FIGS. 6-10 herein. The modulator 454 may be controlled via control signals from the processor subsystem 458 in the same manner as described in connection with FIG. 6.

The sensor 456 may include one or more image sensors, for example FPAs, such as any of those sensors described herein in connection with FIG. 2 (e.g., sensor 170) or FIGS. 6-10.

The processor subsystem 458 controls the overall operation of the system 450 and may be configured to cause the system 450 to capture 3D image data and also perform the method described in FIG. 4. For example, the processor subsystem 458 may cause the system 450 to capture actively illuminated images in accordance with the timeline 300 disclosed in connection with FIG. 3. The processor subsystem 458 may include the functionality and components included in the processor subsystem 540 described in connection with FIG. 6.

FIG. 6 schematically illustrates a second exemplary 3D imaging system or camera 500 employing one or more of the disclosed techniques for reducing undesirable effects of retro-reflections. The system 500 can be used in applications such as robotic vision, autonomous vehicles, surveying, video game controls, smartphone cameras, video or still cameras, visual effects, augmented-, mixed-, virtual-reality or similar, mapping, and other applications where it is useful to know coordinate or location information about areas of the real-world. The system 500 is able to capture the 3D information along with images or video in high resolution in the same way two dimensional (2D) video cameras and cell phone cameras function today. Size, weight, and power requirements for the system 500 are relevant considerations, and may depend on the application in which the system 500 is used.

The operation and functions of the system 500 and its components are described in further detail in U.S. Pat. No. 8,471,895 B2, which is incorporated by reference in its entirety as if fully set forth herein (referred to herein as the "'895 patent"). However, the system 500 described here differs from the 3D imaging systems disclosed in the '895 patent in that it is modified to perform the method(s) disclosed herein for recording images resulting from a burst of illumination pulses.

It should be appreciated that the functionality of system 500 may alternatively be provided with other optical arrangements, for example as described below. As illustrated in FIG. 6, system 500 includes illumination subsystem 510, sensor subsystem 520, and processor subsystem 540. Each of these subsystems will now be described in greater detail.

The illumination subsystem 510 includes light source 511 for generating a light pulse, transmission (Tx) lens 512 for controlling the divergence of the generated light pulse, and optional phase plate or other beamshaping element 513 for enhancing the spatial profile of the light pulse. The positions of lens 512 and optional phase plate 513 may alternatively be reversed. These elements may also be combined in a single optic or set of optics. The illumination subsystem 510 may generate light pulses that are polarized or that are unpolarized, either directly or by using optics or elements to achieve the desired characteristic. Illumination subsystem 510 is in operable communication with controller 541, which may control and/or monitor the emission of light pulses from light source 511, and which further may control and/or monitor the divergence that transmission lens 512 imparts on the generated light pulse.

The illumination subsystem 510 may generate a light pulse having any suitable form of spatial and temporal profile and any suitable divergence. For example, the subsystem 510 may be configured to generate light pulses each having a smooth spatial profile, a smooth temporal profile, and a divergence of between, for example, 5 and 40 degrees, or greater than 40 degrees. The light pulse may be in any suitable portion of the electromagnetic spectrum, for example, in the visible band (e.g., 400-700 nm) or in the near-infrared band (e.g., 700 nm-2500 nm). Generally, pulses generated in specific regions of the near-infrared band are considered to be more "eye-safe" than pulses of comparable power in the visible band. Light source 511 is configured to generate a light pulse in the desired electromagnetic band, and lens 512 and optional phase plate 513 are configured to provide that light pulse with the desired divergence and optionally further to enhance the pulse's spatial profile. In some cases, light source 511 is a laser producing light pulses having at least 5 µJ energy, or at least 100 µJ energy, or at least 1 mJ energy, or at least 10 mJ energy. Such laser energies may be relatively eye-safe because of the high divergence of the laser beam. In other cases, the laser energies may be eye-safe by using Tx lens designs to achieve required safety thresholds. Or some combination of optical elements may be used to achieve eye-safety or other desired characteristic of the illumination pattern. In some configurations, the illumination pattern matches or approximately matches or is related to the field of view of the Rx lens.

A low-coherence laser that may be used as light source 511, as described in connection with FIGS. 6A-C of the '895 patent, which subject matter is expressly incorporated herein by reference. A low-coherence laser may be configured to provide high output power or energy for a relatively low cost, pulsed laser devices. Lower spatial coherence may also reduce the focusability of the laser on the retina of the eye, thereby improving eye safety. The three-dimensional imaging system 500 is an example of a wide field-of-view system in which the reduced spatial and/or temporal coherence of a laser may be useful. Such a laser source may be a solid-state laser of an appropriate design, or it may be a laser diode or laser diode array. In some configurations, the light source 511 may be a non-laser source such as light emitting diodes (LEDs). The light source 511 may be a single device or several devices that are controlled together or separately by the controller 541. The emitted patterns may overlap at various ranges from the light source 511 or may be arranged to overlap a relatively small amount or not at all as is appropriate for the system design. In some cases, the use of multiple light source or arrays of light sources may reduce intensity fluctuations or self-interference, either at the surfaces of the objects illuminated by the light source or elsewhere in the light propagation.

In some configurations, the light source 511 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

Illumination subsystem 510 may generate a laser pulse having a large divergence, e.g., between 1 and 180, or between 1 and 90, or between 1 and 40, or between 2 and 40, or between 5 and 40 degrees of divergence, and low spatial and/or temporal coherence, whereas a diffraction-limited laser may have a divergence of only a fraction of a degree and a large amount of spatial and temporal coherence. The large divergence and lack of spatial and/or temporal coherence may reduce the amount of intensity fluctuations in the laser irradiance at the surfaces of objects being illuminated with the laser beam. The smoother intensity profile of the laser beam generated by illumination subsystem 510 may improve the performance of sensor subsystem 520.

In some configurations, a low coherence laser may generate pulses having a wavelength of 1400 nm or greater, an energy of 40 mJ or greater, and a pulse duration of less than 500 picoseconds. There are several gain media that emit in this spectral region, including Er:YAG, Cr:YAG, and Tm,Ho:YAG. For example, the material Er:YAG has been used to produce pulses at 1617 nm having 1 nanosecond pulse lengths and 0.6 mJ output at 10 kHz pulse repetition frequencies. Other material that may be used include Nd:YAG, Nd:YVO$_4$, Nd:YLF, Yb:YAG, that can operate at about 946 nm, 912 nm, 1047 nm, 1053 nm, 1046 nm, and other wavelengths and harmonics.

One or more laser diodes may also be used as the light source 511, which can operate at any suitable wavelength, for example, about 808 nm, 858 nm, 905 nm, 855 nm, 915 nm, 946 nm, 980 nm, 1400 nm, 1500 nm, 1550 nm or others. For some applications, such as underwater applications, where blue & green wavelengths are useful, shorter wavelengths may be used, e.g., about 532 nm, 515 nm, 486 nm, 455 nm, 458 nm, 473 nm, center frequencies in between the foregoing values, or the like. One or more LEDs with a similar wavelength may be used as the light source 511. Suitable combinations of the foregoing example light sources may be included in light source 511, and the light sources may have tunable center frequencies.

Referring again to FIG. 6, transmission (Tx) lens 512 may increase the divergence of the light pulse generated by light source 511 (e.g., a low coherence laser or any other suitable laser, including a high coherence laser). For example, although the light pulse from light source 511 may be relatively highly divergent compared to some previously known lasers because the pulse contains many spatially and temporally incoherent modes, the pulse's divergence may in some circumstances still remain well below 1 degree. Lens 512 may be configured to increase the divergence of the light pulse to between 5 and 40 degrees, depending on the distance of the scene from system 500 and the portion thereof to be imaged. Lens 512 may include a single lens, or may include a compound lens, or may include a plurality of lenses or mirrors, that is/are configured to increase the divergence of the pulse to the desired degree, e.g., to between 1 and 180 degrees, or 1 and 120 degrees, or 1 and 90 degrees, or 2 and 90 degrees, or 2 and 40 degrees, 5 and 40 degrees, or between 5 and 30 degrees, or between 5 and 20 degrees, or between 5 and 10 degrees, or between 10 and 40 degrees, or between 20 and 40 degrees, or between 30 and 40 degrees, or between 10 and 30 degrees, for example. Divergences larger or smaller may also be used. In some configurations, the FOV in the horizontal direction may be different from the FOV in the vertical direction. The horizontal and vertical FOVs may take any of the foregoing dimensions. In some configurations, transmission lens 512 may be adjustable, so that a user may vary the divergence of the laser pulse to suit the particular situation. Such an adjustment may be manual (similar to the manual adjustment of a "zoom" lens), or may be automated. For example, controller 541 may be operably connected to transmission lens 512 so as to automatically control the degree of divergence that lens 512 imparts to the laser pulse. Such automatic control may be responsive to user input, or may be part of an automated scene-imaging sequence.

Illumination subsystem 510 optionally may further include phase plate 513, which is configured to further smooth the top of the spatial profile of the light pulse generated by light source 511 so that the spatial profile may be closer to a rectangular shape. The phase plate 513 may also change the divergence of the light pulse or change its spatial distribution as desired. The phase plate may be any optical arrangement that achieves these objectives, such as micro-lenses, a scatter plate, diffuser, holographic plate or any suitable combination of the foregoing.

It should be noted that although illumination subsystem 510 includes light source 511, which is substantially monochromatic, it optionally may include additional types of light sources. For example, illumination subsystem 510 may include a white light source for illuminating the scene with white light. Or, for example, illumination subsystem 510 may include other substantially monochromatic light sources in spectral regions different from that emitted by light source 511. For example, where light source 511 generates laser pulses in one particular portion of the visible spectrum, such as in the green region, e.g., 532 nm, such pulses may cast that hue over the scene. In some circumstances, such as the filming of a movie, this may be undesirable. Illumination subsystem 510 may include one or more additional light sources that generate light that, when combined with the light from light source 511, result in the appearance of white light. For example, where light source 511 generates green laser pulses (e.g., 532 nm), illumination subsystem 510 optionally may further include diodes or lasers or other light sources that emit wavelengths in the red and blue regions, e.g., 620 nm and 470 nm, that, combined with the green laser pulses to produce an illumination that maintains the desired scene illumination characteristics.

The light source 511 may also have elements that emit light at different wavelengths that can be combined by optical elements. Different wavelengths may also be emitted that can be used to differentiate some types of surfaces or materials based on the spectral properties of the object materials. Multiple wavelengths from the light source 511 can also reduce spatial or temporal coherence or may smooth or change the illumination pattern as desired.

Still referring to FIG. 6, system 500 further includes the sensor subsystem 520, which may receive ambient light from a scene along with portions of the light pulse, generated by illumination subsystem 510, that are reflected and/or scattered by objects in the scene. The ambient light may be visible light from the scene, which light may be from ambient sources as described herein above.

The example sensor subsystem 520 may include receiving (Rx) lens 521, optional band-pass filter (BPF) 522, polarizer (Pol.) 523, modulator 524, optional compensator (Cp.) 525, optional imaging lens 526, polarizing beamsplitter 527, and first and second FPAs 528, 529. Sensor subsystem optionally further includes white light imaging subsystem 530, which includes an optional dichroic beamsplitter 531 and optional FPA 532. Sensor subsystem 520 is in operable communication with controller 541, which may monitor and/or control the operation of different components of the sensor subsystem 520, such as receiving lens 521, modulator 524, imaging lens 526, FPAs 528, 529, and optional FPA 532. An alternative example of sensor subsystem 520 omits imaging lens 526, visible imaging subsystem 530, dichroic beamsplitter 531, and FPA 532.

The receiving lens 521 may be a non-collimating lens that collects light from the scene and focuses it into an image, either on the FPA(s) or at an intermediate plane. As discussed above with reference to FIG. 1, the scene may scatter and/or reflect light in a variety of directions other than back toward the three-dimensional imaging system 500. Some of such light may be generated by illumination subsystem 510, while other of such light may be white light or light in a different wavelength range, which may or may not have been generated by illumination subsystem 510. The amount of light collected is proportional to the area of the receiving aperture, e.g., is proportional to the area of receiving lens 521.

To enhance the amount of light collected by sensor subsystem 520, thus increasing the amount of information that ultimately may be contained in each three-dimensional image, receiving lens 521 may be constructed to receive as much light as practicable for the given application. For example, for some applications of the imaging system, the receiving lens 521 may, for example, have a diameter of 1 to 4 inches, or 2 to 3 inches, or for example, about 2 inches, or smaller. For applications in which the imaging system is instead designed to provide high-resolution images for commercial purposes, receiving lens 521 may be made as large as practicably feasible, for example, having a diameter of 2 to 6 inches, or 2 to 4 inches, or 1 to 3 inches, or, for example, 4 inches. Smaller or larger Rx lens 521 diameters than those given above may alternatively be used. The various optical components of sensor subsystem 520 may be configured so as to avoid or reduce clipping or vignetting the light collected by receiving lens 521 using techniques known in optical design. Additionally, receiving lens 521 and the other optical components or coatings may also have a wide angular acceptance, e.g., of between 1 and 180 degrees, or between 1 and 120 degrees, or between 1 and 90 degrees, or between 2 and 40 degrees, or between 5 and 40 degrees.

Receiving lens 521 may include a single lens, or may include a compound lens, or may include a plurality of lenses or mirrors, which is/are configured to collect light from the scene and to image the collected light into an image plane at a defined position within sensor subsystem 520. Receiving lens 521 may be configured to reduce or inhibit the introduction of spherical and chromatic aberrations onto the collected light and non-collimating. In some cases, receiving lens 521 may have design elements to compensate aberrations in other elements of the sensor subsystem 520. In some cases, receiving lens 521 may include design elements to improve the depth of field of the sensor subsystem 520 or reduce its sensitivity to changes in position or to component placement or approximately relate the point spread function of the lens with FPA pixel size or other similar aspect of the sensor subsystem 520.

In some configurations of the system, receiving lens 521 may be adjustable, so that a user may choose to adjust the position of the object plane of lens 521, or the distance at which the scene is imaged to a defined plane within sensor subsystem 520. In some cases, receiving lens 521 can be adjusted to change the angular FOV. Such an adjustment may be manual (similar to the manual adjustment of a "zoom" lens), or may be automated. For example, controller 541 may be operably connected to receiving lens 521 so as to automatically control the position of the object plane of lens 521 or angular FOV of lens 521. In some cases, these adjustments may be performed in part based on the beam divergence imparted by transmission lens 512 (which also may be controlled by controller 541). Such automatic control may be responsive to user input, or may be part of an automated scene-imaging sequence, as described in greater detail below. In some cases, the beam divergence of the receiving lens 521 may be adjusted independently of the divergence from the illumination subsystem 510 or vice versa.

Sensor subsystem 520 may optionally include the imaging subsystem 530, so the light collected by receiving lens 521 is imaged at two image planes. Specifically, in this configuration, the collected light passes through dichroic beamsplitter 531, which is configured to redirect at least a portion of the collected visible light or other range of wavelengths onto FPA 532, which is positioned in the image plane of receiving lens 521. FPA 532 is configured to record a color or grey-scale image of the scene based on the visible light it receives. In some configurations, FPA 532 is substantially identical to first and second FPAs 528, 529, and is configured so that the visible light image it records is registered, either mechanically, electronically or by some other means, with the images that the first and second FPAs record. FPA 532 is in operable communication with controller 541, which obtains the image from FPA 532 and provides the obtained image to storage 542 for storage, which may be accessed by image constructor 543 to perform further processing, described in greater detail below. It should be appreciated that visible imaging subsystem 530 alternatively may be configured to obtain an image based on any other range of light, for example, any suitable broadband or multiband range(s) of light.

Alternatively, the visible imagine subsystem 530 and its associated components 531, 532 may be omitted, and instead a low cost, low resolution sensor (not shown) can be used by the system 500 to capture visible image information. Operation of the low cost sensor can be controlled by and image data processed by the controller 541. The controller 541 can also register electronically the low cost sensor image data with image data captured by FPAs 528, 529.

In the system 500 shown in FIG. 6, light that dichroic beamsplitter 531 does not redirect to FPA 532 is instead transmitted to band-pass filter (spectral filter) 522, which is configured to block light at wavelengths other than those generated by illumination subsystem 510 (e.g., has a bandwidth of ±5 nm, or ±10 nm, or ±25 nm, or asymmetric bandpasses), so that the remainder of sensor subsystem 520 receives substantially only the light emitted by illumination subsystem 510 that the scene reflects or scatters back towards system 500 (e.g., pulse portions 127, 128, 129 illustrated in FIG. 1) and ambient background light in the same frequency band. Other spectral filters may be included. The spectral filter 522 and any others included may each be a separate optical elements or a coating. For example, the filter 522 may be a coating on the Rx lens 521 or some other optical component of the sensor subsystem 520. The filter 522 may also be located elsewhere along the optical axis of the sensor subsystem 520, e.g., in front of Rx lens 521 or after the polarizer 523.

The light transmitted through band-pass filter 522 is then transmitted through polarizer 523, which eliminates light of polarization other than a desired polarization, e.g., so that the light transmitted therethrough is substantially all H-polarized, or substantially all V-polarized (or right handed circularly polarized, or left handed circularly polarized or other desired polarization state). Although shown as following the band-pass filter 522, the polarizer 523 may be placed elsewhere along the optical axis of the sensor subsystem for example, before the Rx lens 521.

Polarizer 523 may be, for example, a sheet polarizer, a coating applied to an optical element, or a polarizing beamsplitter. The polarizer type may be chosen so that it is relatively insensitive to the angle of incidence of the incoming light. The light transmitted through polarizer 523 is then transmitted through modulator 524, which may be positioned at or near the other image plane of receiving lens 521. In other configurations, the modulator 524 is positioned at a location that is not the image plane. In some cases, it is positioned at or near the pupil plane of the receiving lens 521. In other cases, the modulator is positioned at a plane that is not related to the image or pupil plane of the receiving lens 521. The modulator may be positioned at any arbitrary plane between the receiving lens 521 and the FPA plane (accounting for any other optics illustrated in FIG. 6 that are in the system design). The functionality of modulator 524 is described in greater detail below. The image plane of receiving lens 521 may be at a location in sensor subsystem 520 other than in modulator 524.

The polarizer 523 may be crossed with polarized light that may be emitted from the illumination subsystem 510 in some configurations of system 500. The configuration of the polarizer 523 and polarized light pulse with polarizations at, for example, about 90° relative to each other greatly reduces the effect of glint or bright reflections from highly reflective objects in a scene. Further details of this crossed-polarizer configuration are disclosed in U.S. provisional patent application 62/573,156, which is hereby expressly incorporated by reference in its entirety as though fully set forth herein.

The modulator 524 optionally may be followed by compensator (Cp.) 525, which may correct phase errors that modulator 524 may impose on the beam due to variations in the beam angle or other material phase property, thus further enhancing the acceptance angle of modulator 524. Compensator 525 may include a material having the opposite birefringence of the material in modulator 524. For example, where modulator 524 includes potassium dihydrogen phosphate (KDP), compensator 525 may include magnesium fluoride ($MgF_2$) which has the opposite birefringence of KDP and is commercially available. Other materials may be suitable for use in compensator 525, depending on the characteristics of the material used in modulator 524, such as if the modulator material is potassium dideuterium phosphate (KD*P), compensator materials may be rutile, yttrium lithium fluoride (YLF), urea, or yttrium orthovanadate ($YVO_4$), among other birefringent materials. Additionally, the thickness of compensator 525 may be selected to provide an appropriate contrast ratio over the acceptance angle of the system. For other modulator designs, such as modulator materials that are oriented such that the crystal axis is orthogonal or some other angle to the system optical axis, the compensator may be a second modulator with the crystal axis rotated 90 degrees about the optic axis. In some cases, the compensator material may be the same material as used in the modulator. Also, the compensator and modulator may be combined into a single unit. The compensator may also be an electro-optic material with voltage applied. Examples of modulator and other possible compensator materials are potassium dihydrogen phosphate (and its isomorphs), lithium niobate, lithium tantalate, potassium titanyl phosphate (and its isomorphs), potassium titanyl niobate, barium titanate, and other electro-optically active materials.

Following transmission through and modulation by modulator 524 and optional compensator 525, imaging lens 526 images the modulated light onto first and second FPAs 528, 529. Specifically, polarizing beamsplitter 527 separates the orthogonal polarization components of the modulated beam (e.g., the H- and V-polarization components, or left- or right-handed circularly polarized components), which it then redirects or transmits, respectively, to first and second FPAs 528, 529, which are positioned in the image plane of imaging lens 526. Alternatively, imaging lens is not present, and the FPAs 528, 529 are positioned at or near the image plane of receiving lens 521. Imaging lens 526 may include a single lens, a compound lens, or a plurality of lenses or reflective surfaces. In some configurations, two imaging lens 526 may be placed after the polarizing beamsplitter 527, with one each in front of FPAs 528, 529. First and second FPAs 528, 529 record images of the modulated light imaged upon them, and are in operable communication with controller 541, which obtains the recorded images and provides them to storage 542 for storage and further processing by image constructor 543.

A description of various configurations of modulator 524 and FPAs 528, 529 will now be provided. A description of the calculation of object positions and shapes within the scene is provided in the '895 patent with reference to processor subsystem 540, which subject matter is expressly incorporated by reference herein. As described in the '895 patent, the modulator 524 may be used to vary the polarization of the laser pulse portions reflected from the scene, allowing for the ranges and shapes of objects in the scene to be calculated with high precision. A Pockels cell or a Kerr cell may in some cases be used to perform such a modulation. However, previously known Pockels cells typically have relatively small apertures (e.g., 1 cm or smaller) and small acceptance angles (e.g., less than 1 degree) and operate at relatively high voltages, which may make them undesirable for use in imaging systems. Additionally, the angular extent of the reflected light received by the modulator may be depending on the design of the receiving optical elements and position of the elements. As such, it may be desirable to use a modulator having a wider acceptance angle, a wider aperture, and/or a lower operating voltage. For example, in the three-dimensional imaging system illustrated in FIG. 6 the light captured by receiving (Rx) lens 521 may have angles varying between 5 and 40 degrees and an aperture of 2-4 inches, for example, or any of those previously disclosed above. Thus, the polarization modulator may have a large aperture, a low operating voltage, and a large acceptance angle, e.g., greater than 5 degrees, for example, between 5 and 40 degrees, or other acceptance angles, e.g., between 1 and 180 degrees, or between 1 and 120 degrees, or between 1 and 90 degrees, or between 2 and 40 degrees, or between 5 and 40 degrees, or less than 1 degree. The polarization modulator may have a high contrast ratio, e.g., greater than 300:1, or greater than 500:1. Lower contrast ratios may be used instead, for example, a contrast ratio of 10:1 or 20:1 may be used in some applications.

Configurations of the system 500 in which the modulator 524 is a Pockels cell are further described in the '895 patent, which subject matter is expressly incorporated herein by reference. Although system 500 of FIG. 6 is described in the '895 patent as including a Pockels cell-based modulator, other types of modulators and/or modulation schemes may be used to encode the TOFs of reflected/scattered pulse portions from the scene as an intensity modulation on an FPA, as is further described in the '895 patent, which subject matter is also expressly incorporated herein by reference.

The first and second FPAs 528, 529 are positioned in the focal plane of optional imaging lens 526, and respectively receive light of orthogonal polarizations. For example, polarizing beamsplitter 527 may direct light of V-polarization onto FPA 528, and may transmit light of H-polarization onto FPA 529. In other configurations, FPAs 528 and 529 may receive other polarization arrangements. FPA 528 obtains a first image based on a first polarization component, and FPA 529 obtains a second image based on the second polarization component. FPAs 528, 529 provide the first and second images to processor subsystem 540, e.g., to controller 541, for storage and further processing, as described in greater detail herein. In some cases, FPAs 528, 529 are registered or approximately registered with one another to determine pixel correspondences. Such registration may be performed mechanically, or may be performed electronically (e.g., by image constructor 543).

In an alternative example of system 500 that omits the imaging lens 526, the FPAs may be positioned in the focal plane of the Rx lens 521.

The FPAs 528, 529 may be off-the-shelf CCD or CMOS imaging sensors. In particular, such sensors may be readily commercially available for visible-wavelength applications, and require no significant modification for use in system 500, even for non-visible wavelengths. In some cases, sensors that have improvements in sensitivity or noise for particular wavelengths or angles of incidence or other light properties may be used. In one example, FPAs 528, 529 are commercially purchased CCD sensors having 2 Megapixel resolution. In other examples, the FPAs 528, 529 may be CMOS sensors having 250 k to multi-mega pixel resolution. Combinations of CMOS and CCD image sensor may be used. Some sensors for use in near-infrared applications are currently commercially available. It is anticipated that any of a variety of sensors, including those yet to be invented, may be used successfully in the disclosed systems.

In some circumstances, for example, providing a focal plane array in which each pixel has a deep electron well, e.g., greater than 10,000 electrons, or greater than 30,000 electrons, or greater than 100,000 electrons, may enhance the signal to noise ratio obtainable by the system. The focal plane array also, or alternatively, may have a high dynamic range, e.g., greater than 40 dB, or greater than 60 dB. Additionally, wells of such effective depths may be obtained by combining the outputs of pixels of shallower depth (e.g., 4 pixels each having a well depth of 25,000 or more electrons). Each pixel of the FPA may be designed to substantially inhibit "blooming," so that the electrons of any pixels that may become saturated do not bleed over into adjacent pixels.

The processor subsystem 540 includes controller 541, storage 542, image constructor 543, GPS unit 544, and power supply 545. The subsystem 540 may also include the inertial measurement unit 165 shown in FIG. 2. Not all of such components need be present. The functionalities of such components may alternatively be distributed among other components of system 500, including but not limited to on-board processors on FPAs 528, 529. As described above, controller 541 may be in operable communication with one or more elements of illumination subsystem 510, such light source 511 and transmission (Tx) lens 512, and/or of sensor subsystem 520, such as receive (Rx) lens 521, optional FPA 532, modulator 524, and first and second FPAs 528, 529. For example, modulator 524 may be configured to modulate the polarization of light pulse portions transmitted therethrough as a function of time, responsive to a control signal from controller 541. The controller 541 may send a control signal to voltage source, which applies appropriate voltages to Pockels cells in the modulator 524. Controller 541 is also in operable communication with storage 542, image constructor 543, optional GPS unit 544, inertial measurement unit 165, and power supply 545.

Controller 541 is configured to obtain images from optional FPA 532 and first and second FPAs 528, 529 and to provide the images to storage 542 for storage. Storage 542 may RAM, programmable ROM, flash memory, a hard drive, flash drive, or any other suitable computer-readable storage medium.

The image constructor 543 is configured to process the images stored in the storage 542. Alternatively, the constructor may be configured to operate on images while still in memory of other portions of processor subsystem 540. The functionality of the image constructor 543 and controller 541 may be combined in a single device. The image constructor 543 may be implemented using any suitable type of circuitry, for example, one or more programmable processors, ASICs, FPGAs, discrete logic components or any suitable combination of the foregoing. For example, the image constructor 543 may include one or more programmable devices, such as a microprocessor or digital signal processor (DSP) that are programmed to obtain the stored images from storage 542 and to construct three-dimensional images based thereon, as described in greater detail below. Additionally, the image constructor 543 may also execute programming code that causes it to produce images captured by FPAs 528, 529, 532 by performing the input polarizer adjustments disclosed herein.

For example, prior to calculating any TOF values or range values, the image constructor 543 may cause the system 500, under the control of controller 541, to illuminate a target scene with the illumination system 510 and capture images with each of the FPAs 528, 529, 532, or some combination thereof, according to the described 3D imaging operation of the system 500. Each of these captured images are actively illuminated images. The actively illuminated images may each be stored in storage 542. The images may then be used by the system 500 to generate visual and/or 3D images, TOF values, range values or the like as described herein and in further detail the '895 patent.

The controller 541 and/or image constructor 543 of the processor subsystem 540 may be programmed to time the sequence the exposure periods of the system 500 as depicted in FIG. 3.

The optional GPS 544 is configured to identify the position and/or attitude of system 500 as it obtains images, and to provide such information to storage 542 to be stored with the corresponding images. Additionally, an accelerometer or other suitable attitude measuring device may be used determine an approximate change in attitude of the system 500 from one frame to the next in a series of images. This information may be used as part of a method to register the images to a global or relative reference frame. Power supply 545 is configured to provide power to the other components of processor subsystem 540, as well as to any powered components of illumination subsystem 510 and sensor subsystem 520.

Responsive to the control signal that controller 541 generates, modulator 524 generates a phase delay between orthogonal polarization eigenstates for pulse portions transmitted therethrough. This modulation is described in detail in the '895 patent, which subject matter is expressly incorporated herein by reference. The generated phase delay is what permits the system 500 to calculate a TOF and corresponding range value, z, for each pixel in an image, as described in the '895, which subject matter is also expressly incorporated herein by reference.

In one configuration of the system 500, first and second discrete FPAs 528, 529 and image constructor 543 may constitute an exemplary means for generating a first image corresponding to received light pulse portions and a second image corresponding to modulated received light pulse portions, which may be used to obtain a three-dimensional image based thereon. For example, the first image may correspond to the sum of two complementary modulated images obtained by FPAs 528, 529 (which sum may be computed by image constructor 543, or alternatively, the sum may be computed by on-board circuitry on one or both of the FPAs), and the second image may correspond to the image obtained by FPA 529. In another configuration, a single FPA and image constructor 543 may constitute an exemplary means for generating a first image corresponding to received light pulse portions and a second image corresponding to modulated received light pulse portions, which may be used to obtain a three-dimensional image based thereon. For example, the first image may correspond to the sum of two complementary modulated images obtained by a single FPA (which sum may be computed by image constructor 543), and the second image may correspond to one of the modulated images. Such configurations may include those in which modulators other than a Pockels cell-based modulator were used to modulate the light pulse portions, e.g., an electro-optic Bragg deflector or other modulator provided herein.

In another configuration of the system 500, the initial distance to a key feature may be determined approximately by a single ranging photodiode or several photodiodes during the previous frame. The timing of the center of the modulation period for subsequent frames may be set in one of several ways. For example, it may be set to the initial value, or may be set based on a trend of a key feature in a series of previous frames, or may be set using optical auto-focus techniques. If more than one ranging diode or auto-focus position is used, algorithms similar to those used in optical auto-focus mechanisms to perform a weighted average of these multiple sites or diodes may be used.

With these techniques, the length of the depth of field (distance window) may be adjusted as appropriate, e.g., by varying the duration of the pulse portion modulation imparted by modulator 524 responsive to control signals from controller 541 in FIG. 6. In addition, if it is desired to obtain higher distance resolution over a certain region of the depth of field (DOF), the slope of the modulation may be increased in that region. The slope may then be decreased during the remainder of the modulation period, producing a lower distance resolution in other areas of the scene where the greater resolution is not needed. It should be appreciated that there are many combinations that may be used to achieve a satisfactory three-dimensional image or movie.

Figure 7:
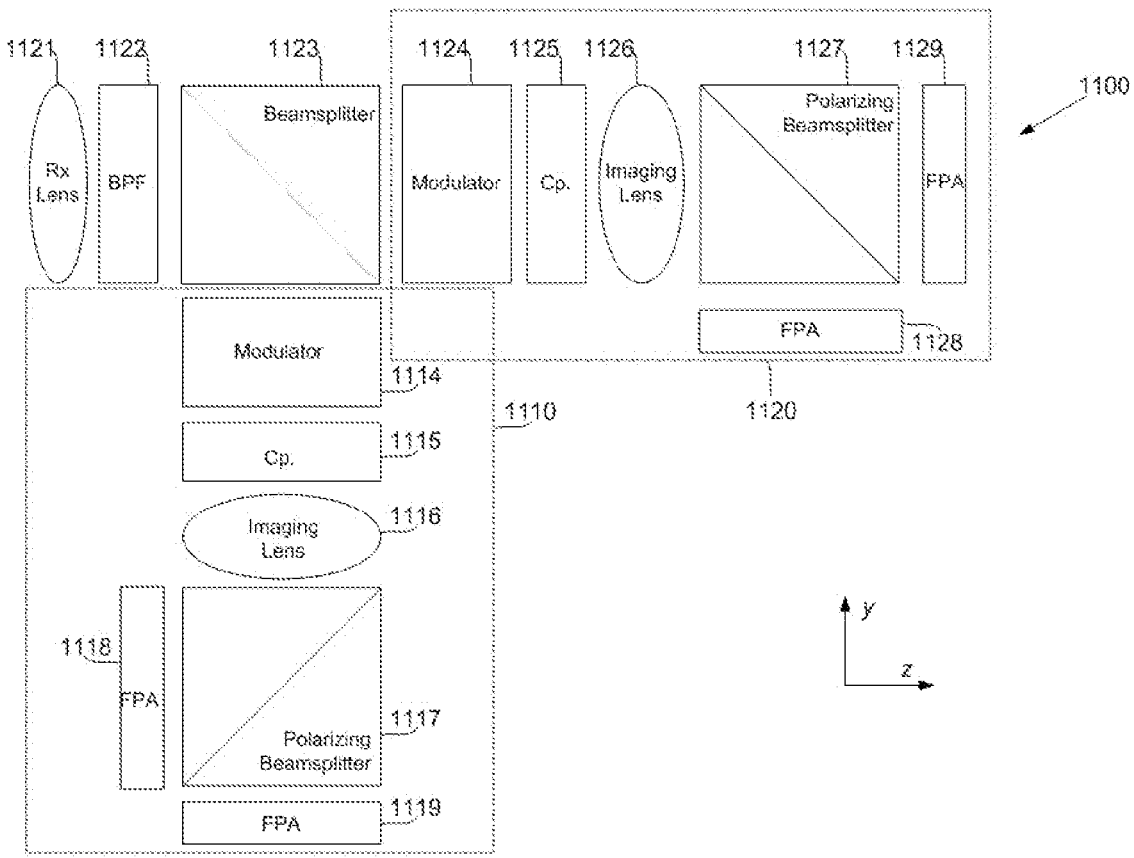
FIG. 7 schematically illustrates a third exemplary 3D imaging system employing at least one of the disclosed configurations for reducing retro-reflections.

FIG. 7 schematically illustrates a third exemplary 3D imaging system 1100 employing one or more of the disclosed techniques for reducing undesirable effects of retro-reflections. The system 1100 includes receiving (Rx) lens 1121 and optional band-pass filter (BPF) 1122, which may be similar to the corresponding elements in FIG. 6, and first and second modulation arms 1110, 1120. System 1100 optionally may also include a visible imaging subsystem such as that illustrated in FIG. 6, but omitted in FIG. 7 for simplicity.

The system 1100 may include the image constructor 543 (not shown) configured to execute programming code that causes it produce images captured by FPAs 1118, 1119, 1128, 1129 by performing the input polarizer adjustment techniques disclosed herein.

The system 1100 includes beamsplitter 1123, which optionally is a polarizing beamsplitter and which allows some of the light from band-pass filter 1122 to be transmitted to first modulation arm 1120, and redirects other of the light from the band-pass filter to second modulation arm 1110. Other spectral filters may be included. The band-pass (spectral) filter 1122 and any others included may each be a separate optical elements or combined with other optical elements, for example, as a coating. For example, the filter 1122 may be a coating on the Rx lens 1121 or some other optical component of the sensor subsystem 1120. The filter 1122 may also be located elsewhere along the optical axis of the sensor subsystem 1120, e.g., in front of Rx lens 1121.

First modulation arm 1120 includes modulator 1124, optional compensator (Cp.) 1125, optional imaging lens 1126, polarizing beamsplitter 1127, and first and second FPAs 1128, 1129, each of which may be the same as the corresponding components discussed above with reference to FIG. 6. Second modulation arm 1110 includes modulator 1114, optional compensator (Cp.) 1115, optional imaging lens 1116, polarizing beamsplitter 1117, and first and second FPAs 1118, 1119, each of which may be the same as the corresponding components in first modulation arm 1120. System 1100 may also include an illumination subsystem and an image processing subsystem that includes a controller, which may be the same as those described above with reference to FIG. 6. In some configurations, either the modulation arm 1110 or the modulation arm 1120 may only use a single FPA 1119 or 1129, respectively, because the normalization image may be obtained from the other arm.

During operation, the controller (not illustrated) of system 1100 may send different control signals to modulator 1124 than to modulator 1115. For example, the controller may send a control signal to modulator 1124 instructing it to vary the polarization of pulse portions transmitted therethrough monotonically as a function of time. In comparison, the controller may send a control signal to modulator 1114 instructing it to vary the polarization of pulse portions transmitted therethrough non-monotonically, e.g., using a sine wave or sawtooth function that repeats multiple times during the duration of the single monotonic modulation of modulator 1124. The images obtained by FPAs 1128, 1129 on first modulation arm 1120 may contain information about a relatively wide distance window, e.g., a 50 meter window. Because this arm does not need to achieve the same resolution, in some cases it may be useful to choose beamsplitter 1123 such that the fraction of light going to this arm is <50%. In contrast, the images obtained by FPAs 1118, 1119 on second modulation arm 1110 may contain information about a relatively narrower distance window that is encompassed by the wider distance window obtained by the first modulation arm. Information in the image obtained by the first modulation arm may be used to fix the position of objects in the image obtained by the second modulation arm, thus providing for simultaneous three-dimensional measurement across the entire depth of field.

The system 1100 may be configured to measure the polarization state of the light pulse portions reflected/scattered by objects the scene. Such polarization states may, in some circumstances, contain additional information about objects in the scene. For example, natural objects tend to change the polarization state of light they reflect, while man-made objects tend not to do so. There may be techniques to use such polarization information to determine the direction of the surface normal of the object area imaged at a given pixel. This surface normal and the change in the surface normal from pixel-to-pixel may be used to improve the distance resolution and extend the depth of field.

The polarization state of the light pulse portions reflected/scattered by objects in the scene may be determined by modifying system 1100 to replace beamsplitter 1123 with a polarizing beamsplitter. Any light that experienced a polarization rotation upon interaction with objects in the scene may be directed onto the second modulation arm 1110, while light that did not experience a polarization rotation may be transmitted onto the first modulation arm 1120. The controller (not illustrated) may send substantially the same control signals to both modulators 1124, 1114, e.g., instructing the modulators to monotonically (for example, linearly) vary the polarization of light transmitted therethrough over a defined temporal window. Thus, the FPAs on both of the modulation arms 1120, 1110 may obtain two-dimensional intensity images of generally the same scene, over substantially the same distance window. However, the images obtained by FPAs 1118, 1119 on the second modulation arm 1110 will substantially only contain information objects that changed the polarization of the incident light. Such information may be combined with the three-dimensional image obtained using the images from FPAs 1128, 1129 to produce an image having enhanced information content.

Additional details, configurations and functions of certain components of the system 1100 are further described in the '895 patent, which is hereby incorporated by reference.

Figure 8:
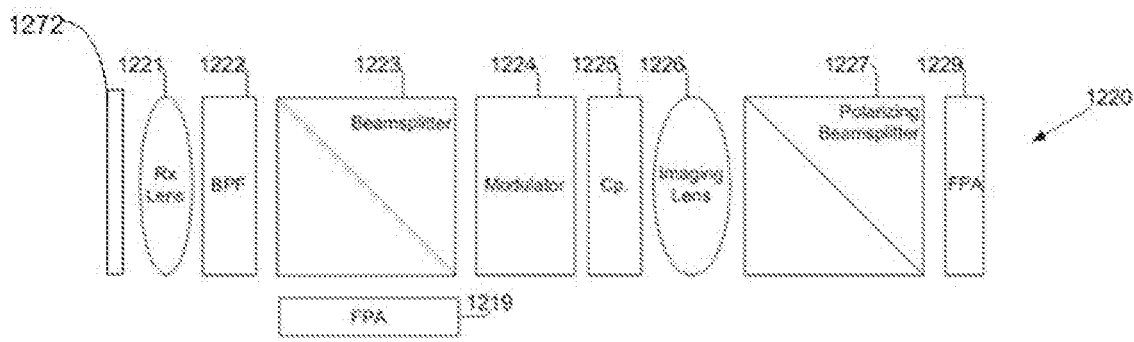
FIG. 8 schematically illustrates an exemplary alternative sensor subsystem that may instead be used with the system of FIG. 6.

FIG. 8 illustrates an alternative sensor subsystem 1220 that may, for example, be used in place of sensor subsystem 520 illustrated in FIG. 6. The subsystem 1220 includes a polarizer 1272 crossed with polarized light that may be emitted from the illumination subsystem 510 in some configurations of the system 500. The configuration of the polarizer 1272 and polarized light pulse with polarizations at, for example, about 90° greatly reduces the effect of glint from highly reflective objects in a scene. Details of the polarizer 1272 and the polarized light source are disclosed in U.S. provisional patent application 62/573,156, which is hereby expressly incorporated by reference in its entirety as though fully set forth herein. The polarizer 1272 may be, for example, a sheet polarizer, a coating applied to an optical element, or a polarizing beamsplitter.

Although not shown in FIG. 6, the polarizer 1272 may also be included in sensor subsystem 520 and used in conjunction with crossed polarized light pulses emitted from the illumination subsystem 510, as described in U.S. provisional patent application 62/573,156. Or the function of polarizer 1272 may be accomplished by polarizer 523 shown in FIG. 6 or any other polarization sensitive element, as described above in connection with FIG. 6. Also, although not shown in FIG. 7, the polarizer 1272 may also be included in system 1100 and used in conjunction with crossed polarized light pulses emitted from an illumination subsystem, as described in U.S. provisional patent application 62/573,156.

Using sensor subsystem 1220, the image constructor 543 (not shown in FIG. 8) may be configured to execute programming code that causes it to produce images captured by FPAs 1219, 1229 by performing input polarizer adjustment disclosed herein.

Sensor subsystem 1220 includes receiving (Rx.) lens 1221, optional band-pass filter (BPF) 1222, modulator 1224, optional compensator (Cp.) 1225, optional imaging lens 1226, polarizing beamsplitter 1227, and FPA 1229, each of which may be the same as described above with respect to the corresponding components illustrated in FIG. 6. However, sensor subsystem 1220 also includes beamsplitter 1223 which is at any suitable position before the modulator (here, between bandpass filter 1222 and modulator 1224), which directs a portion of the received light to FPA 1219, which obtains an image of the scene based thereon. The remainder of the light is transmitted to modulator 1224, which modulates the light transmitted therethrough, and FPA 1229 obtains an image of the scene based thereon. The images obtained by FPA 1219 and FPA 1229 differ in that the former is based on unmodulated light, while the latter is based on modulated light. The image obtained by FPA 1219 may be used to normalize the image obtained by FPA 1229. Specifically, the intensity at any pixel (i,j) of FPA 1219 may be used as the value $I_{total,i,j}$ in the distance calculations discussed with reference to equations (8) to (15) disclosed in the '895 patent, which subject matter is hereby expressly incorporated by reference. In contrast, for the system illustrated in FIG. 6, the value $I_{total,i,j}$ may be calculated by summing the complementary images obtained by FPAs 528, 529. It should be noted that in any alternative arrangement in which a non-modulated image is obtained, the intensity of that image at each pixel (i,j) may be used as the value $I_{total,i,j}$ against which a modulated image may be normalized to obtain distance values, e.g., using equations (8) to (15).

Sensor subsystem 1220 optionally may include visible imaging subsystem 530, omitted from FIG. 8 for clarity.

First and second discrete FPAs 1219, 1229 may constitute an exemplary means for generating a first image corresponding to received light pulse portions and a second image corresponding to modulated received light pulse portions. For example, the first image may correspond to the non-modulated image obtained by FPA 1219, and the second image may correspond to the modulated image obtained by FPA 1229. In another configuration of subsystem 1220, a single FPA constitutes a means for generating a first image corresponding to received light pulse portions and a second image corresponding to modulated received light pulse portions. For example, the first image may correspond to a non-modulated image obtained by the FPA, and the second image may correspond to a modulated image obtained by the same FPA at a different time or using a subset of the pixels included in the FPA.

Other than the polarizer 1272 and the polarized light from the illumination subsystem, the other components of these subsystem 1220 and their operations are further described in the '895, which subject matter is incorporated herein by reference.

Although shown as being located in front of the Rx lens 1221, the polarizer 1272 may be placed elsewhere along the optical axis of the sensor subsystem 1220, for example, after the Rx lens 1221. The polarizer 1272 may be a separate optical elements or combined with one or more other optical elements, for example, as a coating. For example, the polarizer 1272 may be a coating on the Rx lens 1221 or some other optical component of the sensor subsystem 1220.

Figure 9:
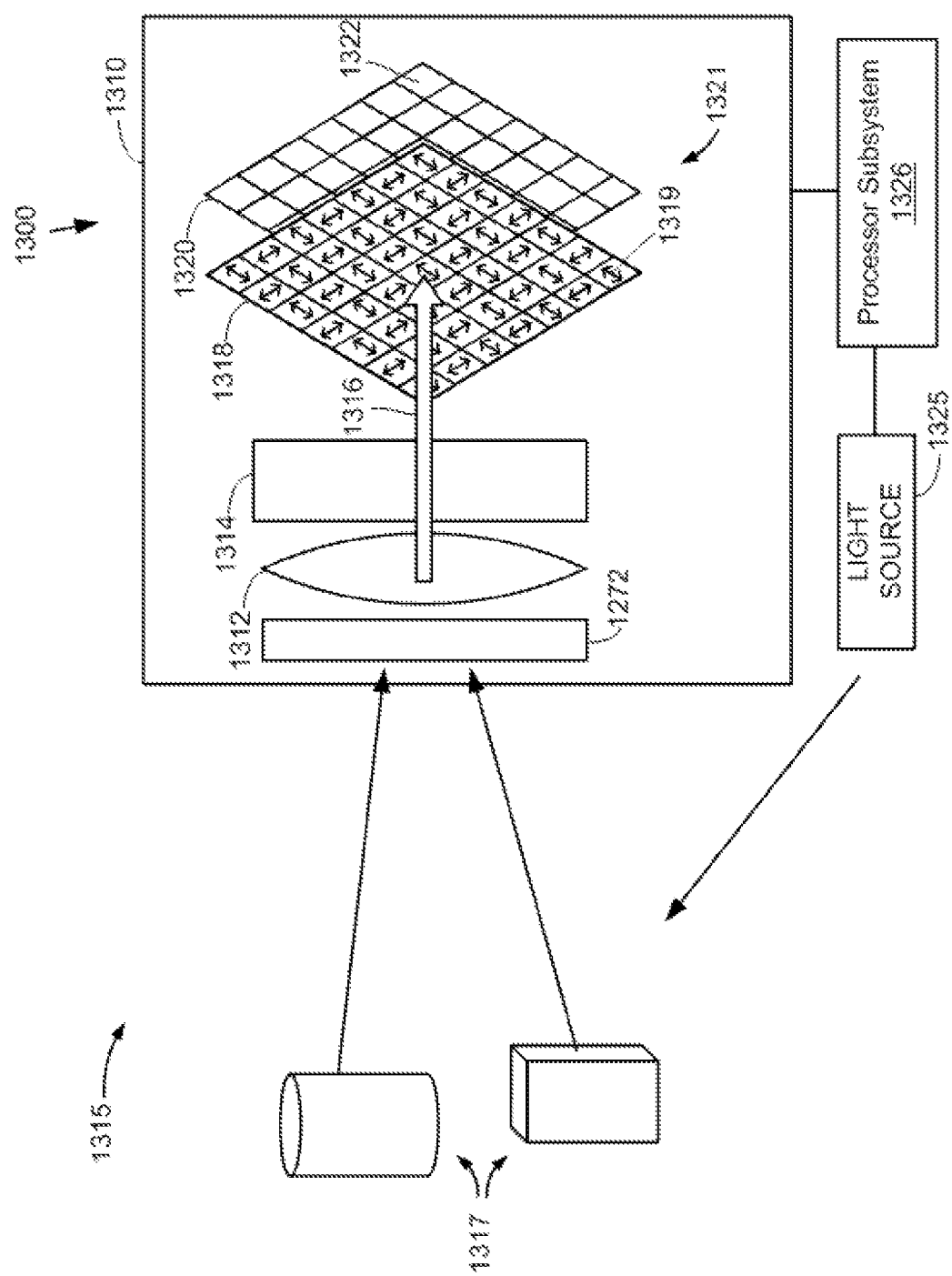
FIG. 9 schematically illustrates a fourth exemplary 3D imaging system employing at least one of the disclosed configurations for reducing retro-reflections.

FIG. 9 schematically illustrates a fourth exemplary 3D imaging system 1300 employing one or more of the disclosed techniques for reducing undesirable effects of retro-reflections. The 3D system or camera 1300 includes sensor subsystem 1310, a light source 1325, such as one of the illumination subsystems 110, 510, and a processor subsystem 1326, such as one the processor subsystems 140, 540. The system 1300 operates in a fashion similar to that described earlier for the other disclosed 3D imaging systems in that it illuminates a scene 1315 with multiple light pulses from light source 1325 and then processes portions of the light pulses returned 1316 to the sensor subsystem 1301 to produce 3D images.

However, the several elements of system 1300 provide the capability of a more compact, monolithic design either separately or in combination. Instead of placing complex circuitry and timing algorithms behind each photosensitive pixel, the system 1300 places the required time-dependent elements in front of each pixel or the array of pixels or photosensitive elements. Instead of using electronic means to affect the voltage or charge signals at each pixel, the disclosed systems use optical, electro-optic, or other means of affecting the light field in front of each pixel or groups of pixels to affect the photon signal. These optical means may be placed in close proximity to the sensor array, between the sensor array and corresponding optical elements, or in front of such optical elements to allow extraction of time or depth (e.g., z-axis distance) information from the incident light field including time-of-flight information.

The sensor subsystem 1310 includes polarizer 1272, Rx optics 1312, such as Rx optics 172 of FIG. 2, modulator 1314, and module 1321, which includes a polarizing grid array 1318 and an image sensor 1320, such as an FPA as described herein. As shown, the incoming light 1316 is imaged by the Rx optics 1312 onto the image sensor array 1320 through the polarizer array 1318, which has a pattern of polarization directions or transmission parameters such as shown in FIG. 9. For example, the figure shows alternating horizontal and vertical linear polarizers in array 1318 arranged to be in front of each pixel 1322, but other arrangements and/or circular or elliptical polarization can be used.

By placing a polarizing element 1319 in front of each pixel 1322 of the sensor array 1320, certain bulky optics may be eliminated for the system 1300. Such micro-grid polarizing arrays can be used to measure the absolute or relative time-of-flight (TOF). Absolute distance measurements can be used in a 3D camera, for among other things, to reduce error buildup, particularly where multiple objects or surfaces are within the scene and where they are not connected, or the connection is not visible from the camera. Any of the 3D systems disclosed herein can utilize absolute and/or relative TOF.

The use of the polarizing grid 1318 also can reduce the thickness of the glass or other material that is used for polarization separation elements, which reduces the amount of spherical and other optical aberrations. In prior systems, these aberrations either degraded the optical performance of the optical system of the 3D camera, or the optical system must be adapted with custom designs to remove or compensate such aberrations. With the techniques disclosed herein, the amount of aberration compensation required of optical elements is reduced or eliminated, or made sufficiently small where existing lens designs produce sufficiently high optical performance.

Additionally, the use of the polarizing grid 1318 opens the possibility of making the modulator/polarization separation/sensor array into a closely coupled or monolithic optical assembly that can be used directly with catalog optical lens or imaging elements. In some circumstances, such as wafer scale manufacturing, no lenses or relay optics would need be placed between the optical modulator and the sensor array/polarizing grid. This can reduce the size and cost of the 3D camera system.

The use of the modulator 1314 (external to the sensor array) as described in the '895 patent (specifically any of modulators 524, 700-701 1124, 1224 disclosed in the '895 patent, which description is specifically incorporated by reference herein, may be used as modulator 1314) to encode the range information eliminates the need for costly custom sensor array or chip development, especially the challenge of scaling chips that can provide high precision timing information which have been limited to about 200 pixels. Combining the modulator approach with the polarizing grid 1318 coupled and aligned to a sensor array 1320 eliminates the need to have two separate sensor arrays and bulky polarizing components such as a polarizing beamsplitter. With a single sensor array 1320, there is alignment and registration between two virtual arrays. The location of each polarization pixel 1320 may be automatically known relatively to the pixels of the orthogonal polarization in position and angle of any surface normal. This reduces manufacturing and calibration complexity.

As shown in FIG. 9, the electro-optic module 1321 includes a grid of polarization elements 1318 is placed in front of, or alternatively on, the surface of an imaging sensor 1320. The imaging sensor 1320 may be a FPA, such as a charge coupled device (CCD) or complementary metal oxide semiconductor (CMOS) array of pixels, described earlier herein. In some configurations, the polarization grid layer 1318 can be placed directly on the surface of the sensor array 1320 using an additional step or steps in the lithographic processing. In others, the grid layer 1318 can be placed on a transparent substrate that is then placed on or in front of the sensor array. In other configurations, the polarizing grid 1318 can be placed within the layers that are above the detector or electronic sites of a sensor array. The polarizing grid 1318 is aligned such that the center of each polarizing element 1319 is positioned approximately coincident with the center of each pixel 1322. For some configurations, the grid 1318 is arranged so that alternating polarizing elements pass orthogonal polarizations. For example, if the first polarizing element is oriented to pass vertical polarization, the next element in the row or column is oriented to pass horizontal polarization. Instead of linear polarizing elements, orthogonal circular polarizing element, both left-handed and right-handed, can also be used. Other configurations may use other patterns of polarizing elements, including elements that pass non-orthogonal polarizations or are not polarized.

Any suitable manufacturing technique may be employed to build the polarizer element array 1318. For example, the polarizing elements 1318 can be made using a variety of techniques, including metal wire-grid polarizers, thin film polarizing layers, stressed polymers, and elements made of liquid crystal devices as well as any other technique that preferentially passes a particular polarization state over others. In some cases, the polarizing elements can be made of material that can be changed with some control signal, either between each pulse or during the pulse. Such elements can be deposited by a variety of methods using film deposition techniques. Some can be created by lithographic techniques such as interspersed exposure (including by multiple beams or wavelengths), etch, and deposition steps. Other such elements can be created by stretching or otherwise stressing materials such as polymers. Some elements can be created by e-beam or laser writing of shapes and structures of the appropriate spacing or dimensions.

By using lithographic fabrication processes, any polarizer grid to sensor array misalignment and non-uniform spacing, non-ideal polarizer performance, and cross-talk between the pixels can be reduced. Because both the polarizer grid 1318 and the sensor array 1320 can be fabricated using lithographic processes, uniformity of spacing are determined by the mask design, which is normally accurate to nanometer levels. Alignment fiducials can be used to align the two grids 1318, 1320 and lithographic precision permits accurately matching the pitch of the grid elements 1319, 1322.

For some configurations, some of the elements of the polarizer array 1318 may have no polarization properties or reduced polarization properties, forming the basis to determine the normalization signal. Any suitable arrangement of polarization elements and non-polarization elements in the grid 1318 can be used depending on the application and system design. These non-polarization elements can be approximately uniform in transmission for multiple wavelengths or they can vary similar to Bayer patterns for color cameras or different filters for IR or thermal cameras or other arrangements at other wavelengths or wavelength regions. For example, they may be opaque or less transmissive of light.

The processor subsystem 1326 controls the overall operation of the system 1300 and may be configured to cause the system 1300 to capture 3D image data and also perform the method described in FIG. 4. For example, the processor subsystem 1326 may cause the system 1300 to capture actively illuminated images in accordance with the timeline 300 disclosed in connection with FIG. 3. As described earlier, the processor subsystem 1326 may be the same as either previously described subsystem 140 or 540.

Additional details about the system 1300 and its operation, as well as various configurations of the array 1318, are described in U.S. published patent application 2017/0248796, entitled "3D Imaging System and Method," filed on Feb. 28, 2017, which is incorporated by reference in its entirety as if fully set forth herein (referred to herein as the "'796 application").

As described earlier in connection with FIG. 8, the polarizer 1272 is crossed with polarized light emitted from light source 1325 to eliminate the effects of glint and reflections from objects in the scene, as described in U.S. provisional patent application 62/573,156, which is incorporated herein by reference. In some configurations of the system 1300, the crossed polarizer 1272 and polarized light source may be omitted. Although shown as being located before the Rx lens 1312, the polarizer 1272 may located elsewhere along the optical axis of the sensor subsystem 1310. The polarizer 1272 may be a separate optical element as shown, or alternatively, it may be combined with any of the other optical elements in the sensor subsystem 1310. For example, the polarizer 1272 may be an optical coating on a sensor subsystem optical element, such as Rx lens 1312 or the modulator 1321.

The camera 1300 may capture 3D information and also capture image or video from a scene 1315 having objects 1317 that scatter or reflect illumination light emitted from a light source 1325. The light source 1325 may be integrated with the sensor subsystem 1310 into the system 1300, as an illumination subsystem such as described in the '895 patent, or alternatively, it may be separated from the camera 1300. The light source 1325 may be any suitable means for illuminating the scene 1315 with polarized light, including those described in the '895 patent. Alternatively/additionally, the light source 1325 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

Although shown as having separated elements in FIG. 9, in some configurations of the camera system 1300, the electro-optic module 1321 may include the optical modulator 1314, grid 1318, and sensor array 1320, as well as an optional polarizer (not shown) located in the optical path before the modulator 1314 integrally formed together as a single unit. This highly integrated configuration of the electro-optic module 1321 may be constructed using the lithographic, etching and deposition techniques described in the '796 application, which subject matter is expressly incorporated by reference.

A compact 3D camera system may be achieved by integrating the elements of a modulated sensor approach described in the '895 patent with a polarizing or transmission grid array, such as grid array 1318. Examples of 3D imaging systems and methods that may be modified to implement the methods and systems described herein are disclosed in the '895 patent at, for example, FIGS. 1-12 and their accompanying written description in the '895 specification. Those portions of the '895 patent describe 3D imaging systems that can be configured to perform the methods and to include the polarizing or transmission grid arrays disclosed herein and are specifically incorporated by reference herein.

The data streams produced and processed by the 3D camera become simpler since there is only one sensor array and no need to time with other sensor arrays. It also becomes simpler to combine multiple 3D cameras or modules together as described in the '895 patent (for example, to use different range windows and modulation waveforms to extend the range window without worsening the range resolution achievable), such as described in the '895 patent with reference to FIG. 10, which portions of the '895 patent are specifically incorporated by reference as though fully set forth herein.

Alternatively, for other modulation schemes, such as Fabry-Perot cavities or other phase-based modulation schemes, where polarization modulation is not used, arrays of elements that vary in transmission between elements in some pattern similar to that described above can be employed instead of polarization elements. Thus, in these schemes, polarizers and polarization elements may be optional. Some elements can be relatively low transmission that may provide the needed finesse for a Fabry-Perot cavity while some elements can be relatively high transmission. The high transmission elements (coupled with high transmission elements on the other side of the Fabry Perot cavity) can be used to determine the unmodulated reference signal, including interpolating the signal to the lower transmission elements for determination of the relative modulation signal as described in the base patent. The arrangement of these pixels can be grouped in various ways, as described in the '796 application, which is expressly incorporated by reference.

Figure 10:
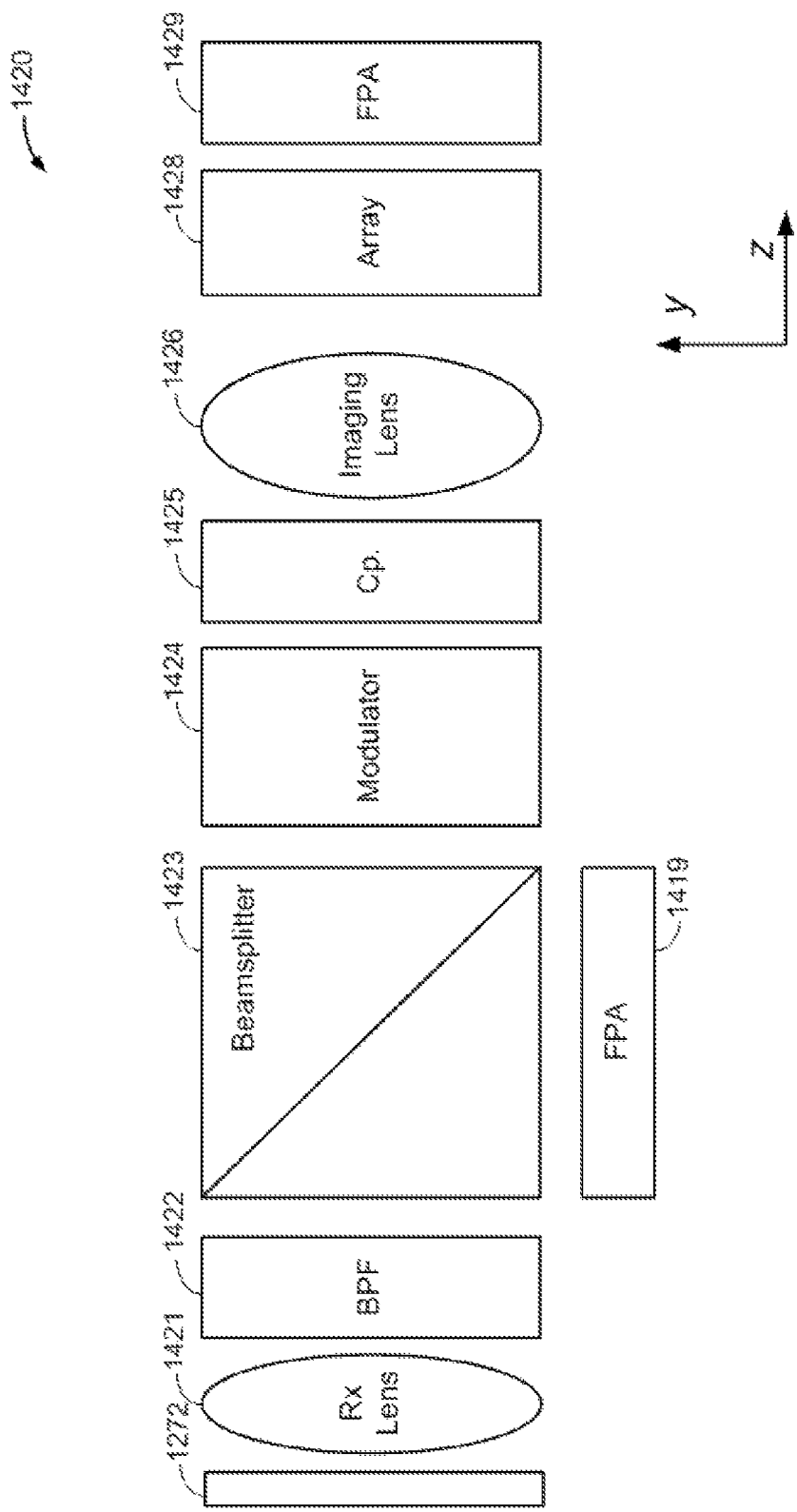
FIG. 10 schematically illustrates another exemplary alternative sensor subsystem that may instead be used with the system of FIG. 6.

FIG. 10 illustrates another alternative sensor subsystem 1420 that may, for example, be used in place of sensor subsystem 520 illustrated in FIG. 6. Sensor subsystem 1420 includes the polarizer 1272, a modulator 1424 and a polarizing grid array 1428. Sensor subsystem 1420 optionally may include visible imaging subsystem 530 show and described in connection with FIG. 6. The subsystem 530 is omitted from FIG. 10 for clarity.

The subsystem 1420 includes polarizer 1272, receiving (Rx) lens 1421, band-pass filter (BPF) 1422, modulator 1424, compensator (Cp.) 1425, optional imaging lens 1426, and FPA 1429, each of which may be the same as described with respect to the corresponding components illustrated in FIG. 6 (except for polarizer 1272). However, system 1420 also includes polarizer 1272 and element grid array 1428, which may be the polarizing array 1318 or any of the polarizing arrays or transmission-based arrays described, for example, with reference to FIGS. 2-7 of the '796 application, which subject matter is incorporated herein by reference.

Some configurations may use all camera elements shown in FIG. 6. For example, the system 1420 can include optional beamsplitter 1423 which is at any suitable position before the modulator (here, between bandpass filter 1422 and modulator 1424), which directs a portion of the received light to FPA 1419, which obtains an image of the scene based thereon. The remainder of the light is transmitted to modulator 1424, which modulates the light transmitted there through, and FPA 1429 obtains an image of the scene based thereon. In some configurations, the images obtained by FPA 1419 and FPA 1429 may differ in that the former is based on unmodulated light, while the latter is based on modulated light. The image obtained by FPA 1419 may be used to normalize the image obtained by FPA 1429. Specifically, the intensity at any pixel (i,j) of FPA 1419 may be used as the value $I_{total,i,j}$ in the distance calculations discussed in the '895 patent with reference to equations (8) to (15), which subject matter is specifically incorporated by reference as if fully set forth herein. Alternatively, in some configurations the intensities measured by FPA 1419 are not needed, instead using the demosaiced intensity sum from FPA 1429.

In other configurations, FPA 1419 is used for images a different wavelength or wavelengths, such as visible light or infrared light or other spectral region. In other configurations, some of the components shown may be omitted or changed in order. For example, in some configurations, the beamsplitter 1423 may be replaced by another variety of polarizing plate or optic or for some instances, omitted altogether if the incident polarization state is of sufficient quality. In some configurations, the compensator 1425 and/or imaging lens can be omitted. Alternatively, the components 1424 through 1428 or some subset thereof can be repeated in other configurations between beamsplitter 1423 and the FPA 1419. The signals obtained from either or both of the FPAs 1419, 1429 can be combined in algorithms described in the '895 patent.

In some configurations of sensor 1420, the beamsplitter 1423, imaging lens 1426, and FPA 1419 are omitted. As described earlier in connection with FIG. 8, the polarizer 1272 is crossed with polarized light emitted from the illumination subsystem to eliminate or reduce the effects of glint and reflections from objects in the scene, as described in U.S. provisional patent application 62/573,156, which is incorporated herein by reference. In some configurations of the subsystem 1420, the crossed polarizer 1272 and glint reduction techniques may be omitted.

Other techniques described in the '895 patent can be combined with a 3D camera using such a transmission array disclosed herein.

Each of the systems 104, 450, 500, 1100, 1300 can be a LIDAR (Light Detection and Ranging) system for measuring distances to objects in a scene by illuminating those objects with a pulsed laser light, and then measuring the reflected pulses with a sensor. Differences in laser return times can be used to make digital 3D-representations of the target scene. The LIDAR applications of the systems are useful in automotive applications, particularly using one or more of the systems as a sensor on an autonomous vehicle to detect and sense objects and their positions around the vehicle. In such an application, one or more of the systems can be mounted on the vehicle to cover fields of view around the vehicle. The systems can detect objects and their positions around the vehicle in real-time as the vehicle moves along roadways and in traffic. The LIDAR variants of the systems may be useful for other applications, such as robotic vision, surveying, video game controls, visual effects, augmented-, mixed-, virtual-reality or similar, mapping, handheld devices such as cameras, smartphones, or the like, and other applications where it is useful to know coordinate or location information about areas of the real-world.

Additionally or alternatively, the pulse light source and methods described in U.S. patent application Ser. No. 14/696,793 filed Apr. 27, 2015, entitled "Method and System for Robust and Extended Illumination Waveforms for Depth Sensing in 3D Imaging" may be used with the systems and methods disclosed herein, and the subject matter of that application is hereby expressly incorporated by reference in its entirety as though set forth fully herein.

Additionally or alternatively, any of the electro-optic modulators disclosed in co-pending U.S. patent application Ser. No. 15/857,263, entitled "Wide Field of View Electro-Optic Modulator and Methods and Systems of Manufacturing and Using Same," filed on Dec. 28, 2017 may be incorporated in the 3D systems disclosed herein as a modulator and/or compensator. The subject matter of U.S. patent application Ser. No. 15/857,263 is hereby expressly incorporated by reference in its entirety as though set forth fully herein.

To accomplish ambient light reduce/elimination and achieve lower illuminator costs, some versions of the systems disclosed herein may be additionally configured to include the techniques and methods of ambient light reduction described in co-pending U.S. patent application Ser. No. 15/823,482 and/or the multi-pulse illumination image processing techniques described in co-pending U.S. patent application Ser. No. 15/857,416. The subject matter of both of these applications is hereby incorporated by reference as though fully set forth herein in its entirety.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or component for purposes of clarity, it should be understood that the techniques of this disclosure may be performed by any suitable combination of components or modules associated with an image processing system.

The foregoing description is illustrative and not restrictive. Although certain exemplary embodiments have been described, other embodiments, combinations and modifications will occur readily to those of ordinary skill in the art in view of the foregoing teachings.

What is claimed is:

1. A system, comprising:
   an illuminator configured to emit an illumination signal for illuminating a scene; and
   an optical receiver configured to receive returned portions of the illumination signal scattered or reflected from the scene;
   wherein the illuminator and optical receiver are physically separated from each other by a predetermined distance that prevents a retro-reflection of a retroreflector from being received by the optical receiver;
   wherein the predetermined distance is based on a retroreflection cone angle of the retro-reflection.

2. The system of claim 1, further comprising two or more illuminators physically separated from the optical receiver by predetermined distances, wherein each of the predetermined distances prevents any retro-reflections from any microprism-type retroreflectors in the scene from being received by the optical receiver.

3. The system of claim 2, wherein the optical receiver is centrally located between the illuminators.

4. The system of claim 1, further comprising two or more optical receivers physically separated from the illuminator by predetermined distances, wherein each of the predetermined distances prevents any retro-reflections from any microprism-type retroreflectors in the scene from being received by the optical receivers.

5. The system of claim 4, wherein the illuminator is centrally located between the optical receivers.

6. The system of claim 1, further comprising:
   an adjustable polarizer in optical communication with the optical receiver.

7. The system of claim 6, further comprising:
   a processor configured to adjust the polarization state of the adjustable polarizer.

8. The system of claim 1, wherein the illuminator is configured to emit a sequence of predetermine light pulses.

9. The system of claim 1, wherein the system is configured to mount onto an automobile.

10. The system of claim 9, wherein the illuminator is located at or about a headlight of the automobile and the optical receiver is centrally located behind the windshield of the automobile.

11. The system of claim 10, further comprising two or more illuminators, wherein each of the illuminators is co-located with a respective headlight of the automobile.

12. The system of claim 1, further comprising:
   a modulator, located within the optical receiver, configured to modulate as a function of time an intensity of the returned portions to form a modulated received light pulse portion;
   a first imaging sensor array, in optical communication with the modulator, configured to generate a first image based on the modulated received light pulse portion; and
   a second imaging sensor array, in optical communication with the modulator, configured to generate a second image based on the modulated received light pulse portion; and
   a processor subsystem configured to obtain a three-dimensional image based on the first and second images.

13. The system of claim 12, wherein the modulator comprises an etalon.

14. The system of claim 12, wherein the modulator comprises a Pockels cell.

15. A method of reducing retro-reflections in an active illumination system, comprising:
   emitting from an illuminator an illumination pulse for illuminating a scene so as to generate a first returned light pulse portion of the illumination pulse scattered or reflected from the scene, the first returned light pulse portion including a retro-reflection of a retroreflector in the scene, the retro-reflection having a retroflection cone angle; and
   receiving, at an optical receiver, a second returned light pulse portion of the illumination pulse scattered or reflected from the scene, the optical receiver being located away from the illuminator by a predetermined distance based on the retroreflection cone angle such that the second returned light pulse portion excludes the retro-reflection of the retroreflector in the scene.

16. The method of claim 15, further comprising:
   modulating, as a function of time, intensity of the second returned light pulse portion with an adjustable polarizer in optical communication with the optical receiver.

17. The method of claim 16, in which the modulating comprises adjusting a polarization state of the adjustable polarizer.

* * * * *